(12) United States Patent
Coleman et al.

(10) Patent No.: US 10,270,521 B2
(45) Date of Patent: Apr. 23, 2019

(54) PSEUDO-GEOSYNCHRONOUS COMMUNICATIONS IN SATELLITE PLATFORMS

(71) Applicant: Vector Launch Inc., Tucson, AZ (US)

(72) Inventors: Shaun Coleman, San Jose, CA (US); Darren D. Garber, Rancho Palos Verdes, CA (US)

(73) Assignee: Vector Launch Inc., Tucson, AZ (US)

( * ) Notice: Subject to any disclaimer, the term of this patent is extended or adjusted under 35 U.S.C. 154(b) by 0 days.

(21) Appl. No.: 15/922,325

(22) Filed: Mar. 15, 2018

(65) Prior Publication Data
US 2019/0028183 A1    Jan. 24, 2019

Related U.S. Application Data

(63) Continuation of application No. 15/653,718, filed on Jul. 19, 2017, now Pat. No. 9,960,837.

(51) Int. Cl.
*H04B 7/185* (2006.01)
*H04L 9/08* (2006.01)
(Continued)

(52) U.S. Cl.
CPC ......... *H04B 7/18521* (2013.01); *G06F 9/455* (2013.01); *H04L 67/327* (2013.01); *H04B 7/18513* (2013.01); *H04B 17/318* (2015.01)

(58) Field of Classification Search
CPC ... H04B 7/195; H04B 7/18552; H04B 7/1856
See application file for complete search history.

(56) References Cited

U.S. PATENT DOCUMENTS 4,912,656 A * 3/1990 Cain .................. H04B 7/18521
709/242
5,410,728 A * 4/1995 Bertiger ............ H04B 7/18521
455/13.1
(Continued)

FOREIGN PATENT DOCUMENTS

CN     101459946 A    6/2009
CN     104902515 A    6/2009
(Continued)

OTHER PUBLICATIONS

Notification of Transmittal of the International Search Report and the Written Opinion of the International Searching Authority, or the Declaration received in International Application No. PCT/US2016/059623, dated Jan. 9, 2017, 12 pages.
(Continued)

*Primary Examiner* — Bernarr E Gregory

(57) ABSTRACT

Systems, methods, and software described herein provide enhancements for orbital satellite platform. In one example, a satellite system includes satellite devices in low-earth orbit (LEO) configured to establish a pseudo-geosynchronous configuration corresponding to a ground communication system by at least transferring instructions for traffic routing from outgoing satellite devices leaving the pseudo-geosynchronous window for receipt by target satellite devices entering the pseudo-geosynchronous window. During passage within the pseudo-geosynchronous window, the target satellite devices are each configured to route communications received in the target satellite devices from ones of the satellite devices through the ground communication system in accordance with the instructions for traffic routing.

20 Claims, 13 Drawing Sheets

(51) Int. Cl.
*G06F 9/455* (2018.01)
*H04B 17/318* (2015.01)
*H04L 29/08* (2006.01)
*H04B 7/00* (2006.01)

(56) References Cited

U.S. PATENT DOCUMENTS

| | | | |
|---|---|---|---|
| 5,414,432 A * | 5/1995 | Penny, Jr. | H04B 7/18552 342/357.59 |
| 5,467,345 A * | 11/1995 | Cutler, Jr. et al. | H04B 7/1856 |
| 5,471,641 A * | 11/1995 | Dosiere | H04B 7/195 455/13.1 |
| 5,483,664 A | 1/1996 | Moritz et al. | |
| 5,561,838 A | 10/1996 | Chandos et al. | |
| 5,666,648 A * | 9/1997 | Stuart | H04B 7/195 342/352 |
| 5,678,175 A * | 10/1997 | Stuart | H04B 7/195 244/158.4 |
| 5,722,042 A | 2/1998 | Kimura et al. | |
| 5,724,345 A | 3/1998 | Guarneri et al. | |
| 5,867,765 A | 2/1999 | Nilsson | |
| 5,886,991 A | 3/1999 | Guarneri et al. | |
| 5,925,092 A | 7/1999 | Swan et al. | |
| 6,178,163 B1 | 1/2001 | Yuan et al. | |
| 6,301,476 B1 | 10/2001 | Monte et al. | |
| 6,512,920 B1 | 1/2003 | Yaoya | |
| 6,603,957 B1 * | 8/2003 | Sherman | H04B 7/18521 455/12.1 |
| 6,868,316 B1 | 3/2005 | Stevens | |
| 6,985,454 B1 | 1/2006 | Wiedeman et al. | |
| 7,151,929 B1 | 12/2006 | Jenkin et al. | |
| 7,463,890 B2 | 12/2008 | Herz et al. | |
| 7,992,134 B2 | 8/2011 | Hinchey et al. | |
| 8,140,816 B2 | 3/2012 | Hofer et al. | |
| 8,286,187 B2 | 10/2012 | Hou et al. | |
| 8,706,869 B2 | 4/2014 | Campion et al. | |
| 8,730,864 B2 | 5/2014 | Natarajan et al. | |
| 8,797,969 B1 | 8/2014 | Harel et al. | |
| 8,819,659 B2 | 8/2014 | Ramer et al. | |
| 9,014,241 B2 | 4/2015 | Dick | |
| 9,030,355 B2 | 5/2015 | Jarvis et al. | |
| 9,042,295 B1 | 5/2015 | Baiter et al. | |
| 9,335,417 B2 | 5/2016 | Kim et al. | |
| 9,363,712 B2 | 6/2016 | Chuberre et al. | |
| 9,442,476 B2 | 9/2016 | Bliss et al. | |
| 9,577,704 B2 | 2/2017 | Baiter et al. | |
| 9,641,238 B1 | 5/2017 | Coleman et al. | |
| 9,654,204 B2 | 5/2017 | Ling et al. | |
| 2002/0150060 A1 * | 10/2002 | Montpetit | H04B 7/18521 370/316 |
| 2003/0185215 A1 | 10/2003 | Wright et al. | |
| 2003/0203717 A1 | 10/2003 | Chuprun et al. | |
| 2004/0157598 A1 | 8/2004 | Parkman et al. | |
| 2004/0219879 A1 | 11/2004 | Stephenson | |
| 2005/0050538 A1 | 3/2005 | Kawamata et al. | |
| 2006/0130056 A1 | 6/2006 | Bozak et al. | |
| 2008/0155610 A1 | 6/2008 | Rosen | |
| 2008/0252514 A1 | 10/2008 | Rigal et al. | |
| 2008/0307466 A1 | 12/2008 | Wang | |
| 2009/0042562 A1 | 2/2009 | Treesh et al. | |
| 2009/0051589 A1 | 2/2009 | Schiff et al. | |
| 2010/0058328 A1 | 3/2010 | DeHaan | |
| 2011/0044236 A1 | 2/2011 | Giffen et al. | |
| 2011/0196451 A1 | 8/2011 | Hill | |
| 2012/0020280 A1 | 1/2012 | Jansson et al. | |
| 2012/0197552 A1 | 8/2012 | Robinson et al. | |
| 2012/0284716 A1 | 11/2012 | Martins et al. | |
| 2013/0141307 A1 | 6/2013 | Nurnberger et al. | |
| 2013/0194132 A1 | 8/2013 | Kim et al. | |
| 2013/0275036 A1 | 10/2013 | Olivier et al. | |
| 2013/0275975 A1 | 10/2013 | Masuda et al. | |
| 2013/0305218 A1 | 11/2013 | Hirsch et al. | |
| 2013/0336168 A1 | 12/2013 | Schlipf et al. | |
| 2014/0039963 A1 | 2/2014 | Augenstein et al. | |
| 2014/0068546 A1 | 3/2014 | Balasubramanian et al. | |
| 2014/0201218 A1 | 7/2014 | Catalano et al. | |
| 2014/0297874 A1 | 10/2014 | Matsubara et al. | |
| 2015/0078178 A1 | 3/2015 | Carides et al. | |
| 2015/0199197 A1 | 7/2015 | Maes et al. | |
| 2015/0215030 A1 | 7/2015 | Moore | |
| 2015/0219744 A1 | 8/2015 | Eikenberry et al. | |
| 2015/0247928 A1 | 9/2015 | Waters et al. | |
| 2015/0318916 A1 | 11/2015 | Gopal et al. | |
| 2016/0009425 A1 | 1/2016 | Thompson et al. | |
| 2016/0037434 A1 | 2/2016 | Gopal et al. | |
| 2016/0080072 A1 | 3/2016 | Baudoin et al. | |
| 2016/0094288 A1 | 3/2016 | Krebs | |
| 2016/0132805 A1 | 5/2016 | Delacourt et al. | |
| 2016/0226150 A1 | 8/2016 | Paleta et al. | |
| 2016/0242024 A1 | 8/2016 | Karren et al. | |
| 2016/0283424 A1 | 9/2016 | Richardson | |
| 2016/0314057 A1 | 10/2016 | De Oliveira et al. | |
| 2016/0380909 A1 | 12/2016 | Antony et al. | |
| 2017/0021947 A1 | 1/2017 | Pellegrino et al. | |
| 2017/0026110 A1 | 1/2017 | Richardson et al. | |
| 2017/0091047 A1 | 3/2017 | Bangalore et al. | |
| 2017/0250751 A1 | 8/2017 | Kargieman et al. | |
| 2017/0195040 A1 | 11/2017 | Sobhani et al. | |

FOREIGN PATENT DOCUMENTS

| | | | | |
|---|---|---|---|---|
| CN | 105471493 A | | 4/2016 | |
| EP | 0365885 A2 | * | 5/1990 | ......... H04B 7/18521 |
| EP | 2319700 A1 | | 5/2011 | |
| FR | 2796229 A1 | | 1/2001 | |
| FR | 2818055 A1 | * | 6/2002 | ......... H04B 7/18521 |
| KR | 20130131652 A | | 12/2013 | |
| WO | WO93/09613 A1 | * | 5/1993 | ......... H04B 7/18521 |
| WO | WO95/13671 A1 | * | 5/1995 | ......... H04B 7/18521 |
| WO | 1996003823 A1 | | 2/1996 | |
| WO | WO99/39459 A1 | * | 8/1999 | ......... H04B 7/18521 |
| WO | 2014022810 A2 | | 2/2014 | |
| WO | 2015098303 A1 | | 12/2015 | |
| WO | 2017023621 A1 | | 2/2017 | |
| WO | 2017027602 A | | 2/2017 | |

OTHER PUBLICATIONS

Panunzio, Marco et al. "An Architectural Approach with Seperation of Concerns to Address Extra-Functional Requirements in the Development of Embedded Real-Time Software Systems". Journal of Systems Architecture. 2014.

"Describing and Deploying Satellite Behaviors Using Rules-Based Statecharts". Kenneth B. Center. PnP Innovations. 2014.

Romer, Kay et al. "The Design Space of Wireless Sensor Networks". Wireless Sensor Networks. IEEE Wireless Communications, vol. 11, Issue 6. 2004.

* cited by examiner

US 10,270,521 B2

PSEUDO-GEOSYNCHRONOUS COMMUNICATIONS IN SATELLITE PLATFORMS

RELATED APPLICATIONS

This application is a continuation of, and claims priority to, U.S. patent application Ser. No. 15/653,718, entitled "PSEUDO-GEOSYNCHRONOUS CONFIGURATIONS IN SATELLITE PLATFORMS," and filed Jul. 19, 2017, now U.S. Pat. No. 9,960,837.

BACKGROUND

Satellites can be deployed into orbit to provide various space-based operations, such as military and civilian observation operations, communications operations, navigation operations, weather operations, and research operations. Satellites can include various sensors and communication equipment that are used to perform desired tasks. However, most satellites deployed in orbit comprise singular entities that are expensive to create and launch into orbit, especially for organizations that may not require the use of an entire satellite with a large number of sensors, or may not require continuous operations on the satellite. As a result, organizations may avoid the use of satellites, limiting the use of promising satellite technology.

OVERVIEW

Systems, methods, and software described herein provide enhancements for orbital satellite platform. In one example, a satellite system includes satellite devices in low-earth orbit (LEO) configured to establish a pseudo-geosynchronous configuration corresponding to a ground communication system by at least transferring instructions for traffic routing from outgoing satellite devices leaving the pseudo-geosynchronous window for receipt by target satellite devices entering the pseudo-geosynchronous window. During passage within the pseudo-geosynchronous window, the target satellite devices are each configured to route communications received in the target satellite devices from ones of the satellite devices through the ground communication system in accordance with the instructions for traffic routing.

This Overview is provided to introduce a selection of concepts in a simplified form that are further described below in the Technical Disclosure. It should be understood that this Overview is not intended to identify key features or essential features of the claimed subject matter, nor should it be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
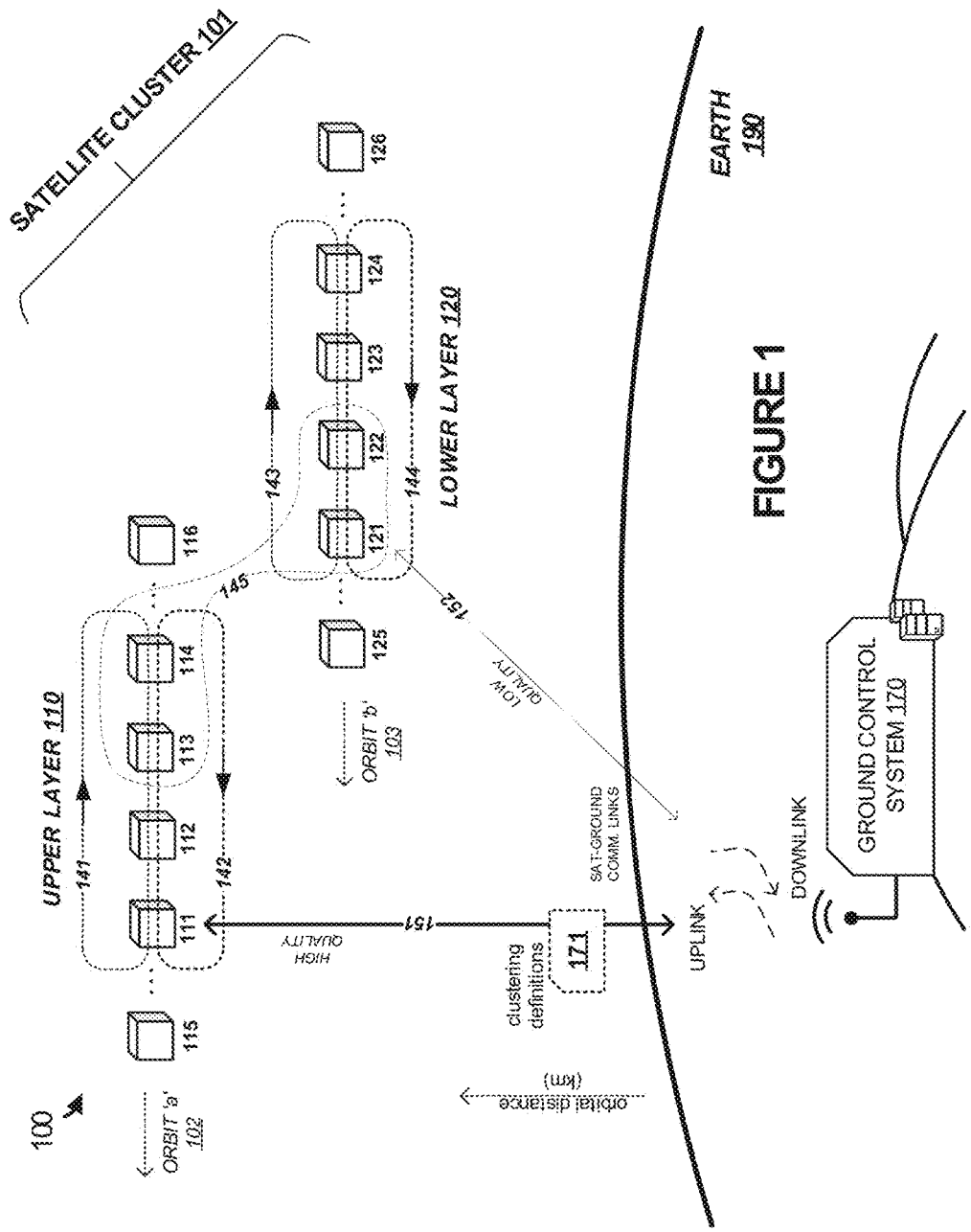
FIG. 1 illustrates a satellite environment according to an implementation.

The various examples disclosed herein provide enhancements for satellite hardware and software technology. For example, a cluster of satellite devices can be deployed into orbit using a launch system. These satellite devices can comprise general-purpose satellite devices, such as CubeSat devices configured with processing systems, storage systems, and communication systems. These satellite devices can also have specialized roles which can be defined according to provisioned hardware or software elements, or can be associated with a particular set of applications deployed to the associated satellites. In some examples, a multi-layered orbital arrangement of a plurality of satellite devices is provided. This multi-layered arrangement provides for enhanced communications, imaging coverage, redundancy, and fault-tolerance, among other operations. Pseudo-geosynchronous windows can be established by the satellite platforms using passage through a virtual or logically-defined window to trigger specialized operations of the satellite devices. Further examples include storage area networks (SAN) configurations where one or more satellite devices can include storage systems used for deployment of virtual machine images, containers, differential state information, or other state information related to the execution of virtual nodes by one or more peer satellite devices of the cluster.

The examples disclosed herein provide systems and methods for deploying software applications in an orbiting satellite platform, wherein each of the software applications executes as a virtual node that can share resources with one or more other applications deployed to the same satellite device. These virtual nodes may comprise full operating system virtual machines in some examples, and may further include virtual containers. These containers may include Docker containers, Linux containers, jails, or another similar type of virtual containment node, which can provide an efficient management of resources from a host system. The resources used by the containers may include kernel resources from the host computing system, and may further include repositories and other approved resources that can be shared with other containers or processes executing on the host. However, although resources may be shared between the containers on a host satellite device, the containers are provisioned to have private access to the operating system with their own identifier space, file system structure, and network interfaces.

In the present example, to provide the satellite platform, a plurality of satellite devices may be deployed, referred herein as satellites or satellite devices. Organizations may generate applications and deploy the applications to the satellite devices to perform desired operations. These operations may include military and civilian observation operations, communications operations, navigation operations, weather operations, and research operations. Applications may be deployed in one or more satellite devices of the orbiting satellite platform. In some implementations, the application may be provided to each of the one or more satellite devices using a ground control system or ground communication system as an uplink to the one or more satellite devices. In other implementations, a single uplink may be made to a satellite device in the platform, wherein the satellite device is configured to distribute the application to other desired satellite devices in the platform. Once deployed in the environment, the application may execute on the assigned satellite devices.

In some implementations, the satellite devices of the satellite platform may each exchange state information with one or more other satellites and the ground control system for the platform. This state information may include current operational state information for each of the applications, such as the tasks or processes that are operating, and may further exchange data generated at least partially from the sensors of the satellite. This data may be used in a peer group, wherein a first satellite may identify a first set of data, and provide the data to a second satellite. The second satellite may then identify second data and, process the first and second data as defined by the application. This operation may be used, as an example, in imaging operations, wherein a first satellite may take images of an object over a first period of time, and provide data for the images to the second satellite. The second satellite may take subsequent images and use the data for the first images and the subsequent images to make a determination about an object. Although this is one example, it should be understood that other operations may use peer sharing of state data to identify characteristics about measured data from the satellite sensors.

As a first example satellite platform, FIG. 1 is shown. FIG. 1 illustrates a satellite environment 100 according to an implementation. Satellite environment 100 includes satellite cluster 101 with satellites 111-116 arranged in upper later 110, and satellites 121-126 arranged in lower layer 120. FIG. 1 also includes ground control system 170 and Earth 190. Satellites 111-116 form a first orbital layer and include a circulating network arrangement for exchanging network communications among members of upper layer 110. Satellites 121-126 form a second orbital layer and include a circulating network arrangement for exchanging network communications among members of lower layer 120. The 'height' of the layers can comprise an orbital distance from the surface of Earth 190, among other distance metrics that can differentiate layers. Satellites 111-114 communicate over wireless network links 141-142, and satellites 121-124 communicate over wireless network links 143-144. In some examples, a further wireless network link 145 is included to couple communications among layers 110 and 120. Ground control system 170 communicates with satellites 111 121 using associated wireless communication links 151-152.

As described herein, a plurality of satellites 111-116 and 121-126 may be launched and deployed as an orbiting platform for a plurality of different software application payloads. Ground control system 170 may initiate an uplink with one or more of the satellites to provide software application payloads to the satellites, as well as update any scheduling information for the satellites. Once uploaded to the desired satellites, the software application payloads may begin execution. In some implementations, the uplink from ground control system 170 may be solely responsible for providing the applications to the required satellites. In other implementations, ground control system 170 may supply an application to a first set of satellites, which may then distribute the application to one or more other satellites of the satellite platform. For example, ground control system 170 may provide a first application to satellite device 111 over link 151, wherein satellite device 111 may, in turn supply the application to other satellites in a peer group. In particular, satellite device 111 may provide the application to satellite 112 that is in the same peer group, permitting satellite 112 to provide operations of the application without directly receiving the communication from ground control system 170. Additionally, similar to providing the initial configuration to the satellites, ground control system 170 may further be used to supply updates to each of the applications operating in the satellite platform, and may further update any scheduling information on each of the satellites.

Figure 2:
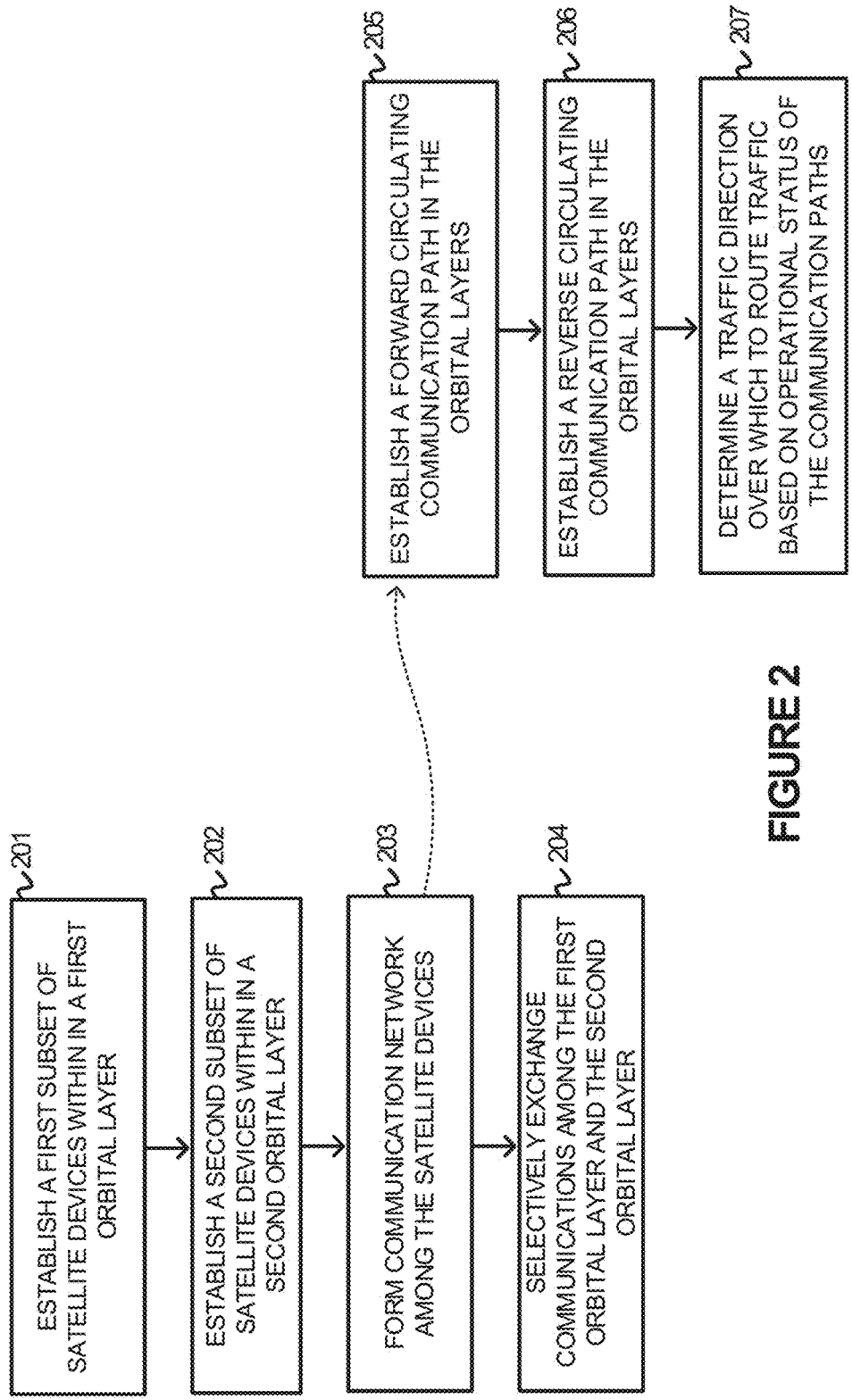
FIG. 2 illustrates an expanded view of a satellite capable of providing a platform for virtual nodes according to an implementation.

FIG. 2 is a flow diagram illustrating example operations of the elements of FIG. 1. In FIG. 2, satellite cluster 101 establishes (201) a first subset of satellite devices within in a first orbital layer 110, establishes (202) a second subset of satellite devices within in a second orbital layer 120. In FIG. 1, the second orbital layer comprises an orbit 103 with a second orbital distance less than an orbit 102 of the first orbital layer, although different distances can be employed. As mentioned above layer 110 includes satellite devices 111-116 and layer 120 comprises satellite devices 121-126. It should be understood that a different number of satellites can instead be employed.

A communication network is formed among members of layer 110 and among members of layer 120, which may be a subset of the total number of satellite devices of a layer. In FIG. 1, a first communication network is formed among satellite devices 111-114 and a second communication network is formed among satellite devices 121-124. A third communication network can be formed among members of both layers in some examples, or the first and second communication networks can be merged into a single network, among other configurations. After formation of the communication networks, satellite devices can selectively exchange (204) communications among the first orbital layer and the second orbital layer.

To form the communication networks, various arrangements and assignments can be identified for associated satellite devices. Satellite cluster 101 can form (203) the communication networks among the satellite devices to selectively exchange communications among the first orbital layer and the second orbital layer based at least in part on an operational status of the communication network. The various communication networks can be formed according to clustering definitions 171 delivered by ground control system 170. The clustering definitions indicate membership assignments for the first subset of satellite devices and the second subset of satellite devices, and the clustering definitions can further indicate a configuration establishing a forward communication path and a reverse communication path within the associated communication network.

Satellite cluster 101 establishes (205) a forward circulating communication path in the orbital layers, and establishes (206) a reverse circulating communication path in the orbital layers. In FIG. 1, upper layer 110 includes forward circulating network pathway 141 and reverse circulating network pathway 142, while lower layer 120 includes forward circulating pathway 143 and reverse circulating network pathway 143. The forward communication paths formed in the orbital layers circulate traffic of the communication networks with a "forward helicity" about an orbital direction of affected satellite device. The reverse communication paths formed in the orbital layers circulate traffic of the communication networks with a "reverse helicity" about the orbital direction of affected satellite devices. Specifically, if an orbital direction of upper layer 110 is indicated by the arrow of orbit 102, then a forward direction will align and propagate traffic through each satellite device in the same direction of travel within the orbit, and a reverse direction will align and propagate traffic through each satellite device in the opposite direction of travel within the orbit, with the directions of travel approximated as a relatively straight line.

In this manner traffic-circulating two pathways are formed in each layer, with traffic passing through each satellite of the associated communication network. For pathway 141, satellite forward routing order comprises 114-113-112-111, while for pathway 142 satellite reverse routing order comprises 111-112-113-114. Similar operation for pathways 143-144 are described in FIG. 1. Failures about satellite devices might then cause an interruption in the pathways among satellites. However, since traffic can circulate in either direction, then redundant pathways are formed to ensure reliable communications among the satellite devices of the layer. Although two layers are shown in FIG. 1 with separate forward/reverse pathways for each layer, it should be understood that individual satellite devices of both layers can share forward/reverse pathways. Furthermore, layer-to-layer link 145 can be employed to communicate traffic among the individual layers.

Each satellite device determines (207) a traffic direction over which to route traffic based on operational status of the communication paths. This operational status can be local status, such as status of communication links formed among a current satellite device and one or more peer satellite devices. This operational status can also be determined for the network as a whole, and reported among the satellite devices. During routing of traffic of the communication network, ones of the satellite devices are configured to determine a traffic direction among the forward communication path and the reverse communication path over which to route the traffic based in part on the operational status of the forward communication path and the reverse communication path. When the operational status of the communication network indicates the forward communication path of the communication network is experiencing a failure, ones of the satellite devices are configured to route the network traffic for delivery to target satellite devices using the reverse communication path.

Once the layers are established, various enhanced operations can be provided by the satellite cluster. For example, satellite-to-ground communications can be facilitated over the communication networks. A source satellite device can identify network traffic for delivery to ground control system 170, and transfer the network traffic for delivery to ground control system 170 over the communication network. The transfer can occur over a particular layer, such as a layer of which the source satellite device is a member. The transfer can also occur in a particular pathway/direction over that layer, such as in a forward or reverse direction based in part on operational status of the communication network of that layer. Moreover, the source satellite device can transfer the network traffic to a peer satellite which can subsequently transfer to another peer satellite, and so on, until a peer satellite is found that can route the network traffic to ground control system 170. For example, the network traffic can originate at satellite device 113, and be routed in a selected forward or reverse direction of pathways 141-142 until the network traffic reaches satellite device 111 which currently has a communication link 151 established with ground control system 170. Based at least on the operational status of the communication network indicates satellite device 111 can presently communicate with ground control system 170.

In further examples, a satellite that can communicate with ground control system 170 might not be included on a current orbital layer, and thus the network traffic can be routed to a different orbital layer, such as orbital layer 120 over link 145. Once the network traffic is on layer 120, then satellite devices 121-124 can route the network traffic until a target satellite device is reached that can route the network traffic to ground control system 170, such as indicated for satellite device 121 and link 152 in FIG. 1.

Turning back to the elements of FIG. 1, satellite devices 111-116 and 121-126 can comprise various hardware and software elements included in an orbital package. In some examples, the satellite devices comprise CubeSat form-factor devices, although variations are possible. Satellite devices can include one or more sensors, communication circuity, processing circuitry, and control/logistical management elements. Figure discussions of satellite devices are included in FIG. 2 and FIG. 13 below.

Satellites 111-116 and 121-126 each include a hardware and software configuration that permits applications to execute as virtual nodes on the satellites. In some implementations, satellites 111-116 and 121-126 may be launched using a launch system without applications, and instead may be provided with a base operating system, virtual machine images, or hypervisor that can be used to load and execute applications as provided in an uplink from ground control system 170. In other implementations, satellites 111-116 and 121-126 may be configured with a first set of applications capable of being executed via an operating system or hypervisor on the satellites. Thus, once into orbit, the applications may initiate execution to provide the operations of the applications. These applications may further be added to, removed, and modified based on information provided in the uplink from ground control system 170.

Ground control system 170 comprises one or more control systems, servers, distributed computing and storage systems, among other elements. Typically, ground control system 170 includes one or more communication systems for receiving communications from satellite devices and for transferring communications to satellite devices. Ground control system 170 can include further network links to other networks, such as packet networks, the Internet, and other entities. In some examples, software payloads are staged in ground control system 170 and deployed to one or more satellite devices over ground-to-satellite links 151-152. Once received by at least a first satellite device, these software payloads can be distributed over peer-to-peer communication links and networks among the various satellite devices. Ground control system 170 can receive network traffic from satellite devices and route the network traffic to other network systems using include routes, bridges, switches, and other network handling equipment. Ground control system 170 also can receive network traffic for delivery to the satellite devices and transfer this network traffic for delivery to the satellite devices for distribution of the network traffic over the various orbital layers, pathways, and peers of the satellite cluster.

Links 141-145 and links 151-152 each comprise one or more communication pathways for exchanging network communications. Links 141-145 and links 151-152 can each comprise various logical, physical, or application programming interfaces. Example links can use optical, air, space, or some other element as the transport media. Links 141-145 and links 151-152 can each use various protocols and formats, such as Internet Protocol (IP), Ethernet, transmission control protocol (TCP), WiFi, Bluetooth, other wireless data interfaces, or some other communication format, including combinations, improvements, or variations thereof. Links 141-145 and links 151-152 can each include direct links or may include intermediate networks, systems, or devices, and can include a logical network link transported over multiple physical links. Links 141-145 and links 151-152 can each include routers, switches, bridges, traffic handling nodes, and the like for transporting traffic among endpoints.

Figure 3:
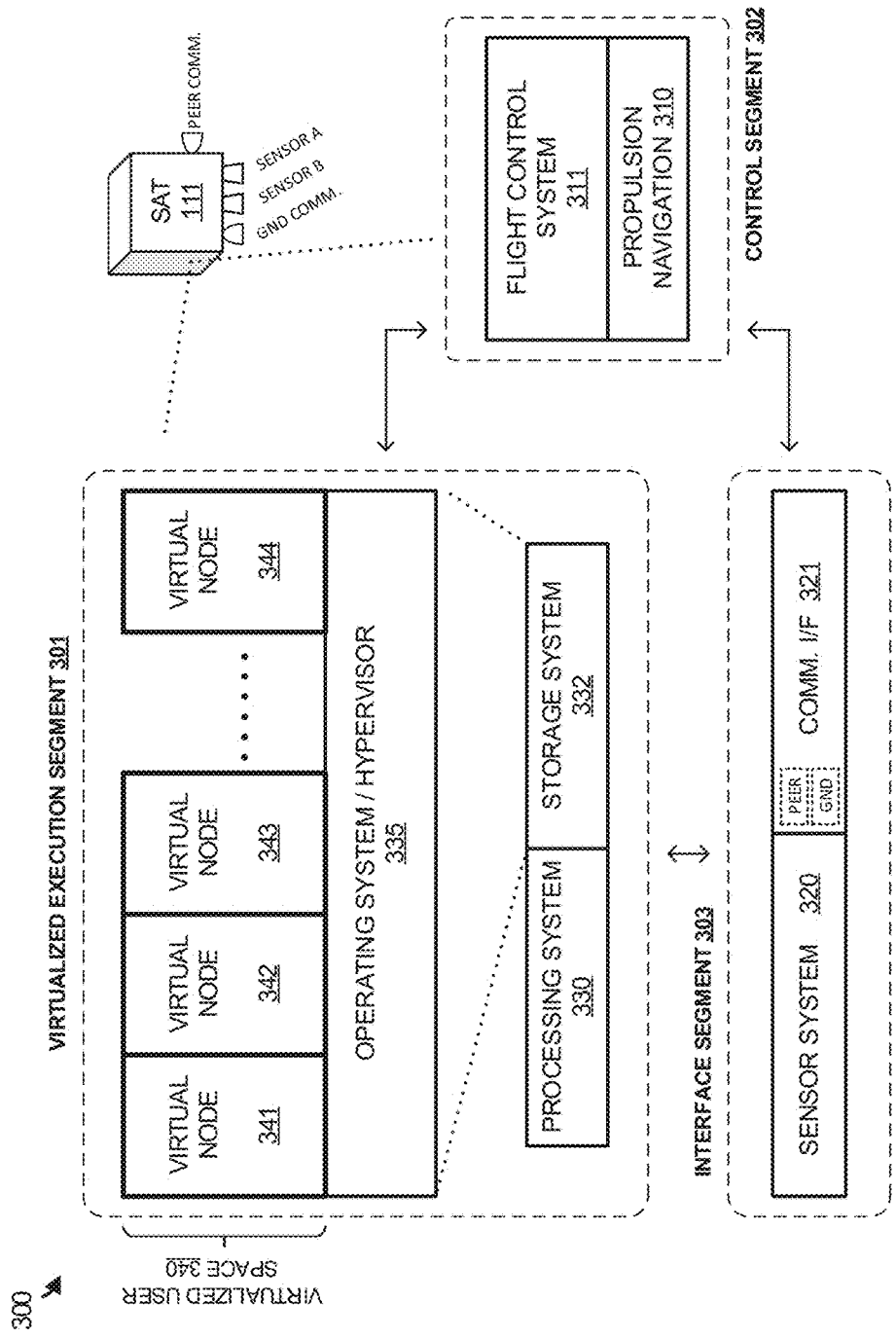
FIG. 3 illustrates operations of layered deployment of satellites according to an implementation.

FIG. 3 illustrates an expanded view 300 of an exemplary satellite device 111 capable of providing a platform for virtual nodes according to an implementation. Any of satellites 111-116 and 121-126 can include similar features, and satellite device 111 is included as representative of any satellite device. Satellite device 111 includes virtualized execution segment 301, control segment 302, and interface segment 303, which may be coupled using various communication links. Virtualized execution segment 301 is representative of a virtualized execution system, which includes a virtualized user space 340 for virtual nodes 341-344, an operating system or hypervisor 335, a storage system 332 to store the operating system and virtual user space, and a processing system 330. Control segment 302 further includes flight control system 311 and propulsion navigation 310. Interface segment 303 further includes user sensor system 320 and communication interface 321, wherein communication interface 321 may be used for ground (gnd) communication and inter-satellite (peer) communication.

Sensor system 320 may include one or more sensor devices, including imaging sensors, temperature sensors, light sensors, signal quality sensors, or some other similar sensor capable of interaction with virtual nodes 341-344. In FIG. 3, sensors 'A' and 'B' are shown as illustrative of downward-facing sensors. It should be understood that other sensors can be included, such as star sensors, space imaging sensors, radiation detectors, or other sensors.

As described herein, organizations may generate applications that are capable of being deployed as virtual nodes on one or more satellites of a satellite platform. These applications may be provided from a ground control system, or may be provided from another satellite via communication interface 321 on satellite device 111. Once the applications are provided, operating system/hypervisor 335, which is stored on storage system 332 and executed by processing system 330 may provide a platform for the execution of the applications. Here, each application provided to satellite device 111 is executed as a separate virtual node in virtual nodes 341-344, wherein the virtual nodes may comprise full operating system virtual machines or containers capable of sharing resources from the underlying operating system in storage system 332.

To manage the execution of the virtual nodes, operating system/hypervisor 335 may manage a schedule that is used to allocate processing resources of processing system 330 to each of the nodes, user sensors 320 to each of the nodes, and other similar resources on satellite device 111. In particular, the schedule may be used to ensure that each application is scheduled to receive processing resources from processing system 330 during defined time periods, and receive access to user sensors 320 during defined time periods. In some implementations, one or more of the applications may execute during the same time period on satellite device 111. These applications may use different sensors in user sensors 320, may time share the use of sensors in user sensors 320, or may use the same data from user sensors 320 in their operation. To allocate the sensors operating system 335 may be responsible for providing each operating virtual node with a communication link to the required user sensor, and deallocating or removing the communication link to the required sensor based on the scheduling. For example, an imaging device may be accessed by virtual node 341 during a first time period, wherein virtual node 341 may access the sensor based on addressing information provided by operating system 335. Once the time period expires, operating system 335 may prevent virtual node 341 from accessing the sensor, in some examples, by removing the addressing access of the virtual node, and allocating access of the sensor to a second virtual node.

In addition to the virtual node operations provided in virtualized execution segment 301, satellite device 111 further includes control segment 302. Control segment 302, which may be communicatively linked to virtualized execution segment 301 and interface segment 303, is responsible for logistical control elements of the satellite device 111. These operations may include managing the deployment of solar panels on the satellite, managing the positioning of the satellite with regards to the Earth or the sun, or any other similar operation. In at least one example, flight control system 311 may monitor for requests from operating system 335, and determine whether the satellite is capable of accommodating the request from operating system 335. For example, virtual node 341 may generate a request to move a user sensor, which also requires movement using propulsion and navigation 310. In response to the request, flight control system 311 may determine that the movement cannot be made, and may prevent the movement of the satellite using propulsion and navigation 310. Further, in some implementations, flight control system 311, may provide a notification to operating system 335 and virtual node 341 indicating that the movement is not permitted.

Although illustrated as a separate system in the example of FIG. 3, it should be understood that in some examples, flight control system may be implemented and stored on processing system 330 and storage system 332. However, it should also be understood that flight control system may be stored on a separate storage system and use a different processing system than operating system 335 and its corresponding virtual nodes.

Figure 4:
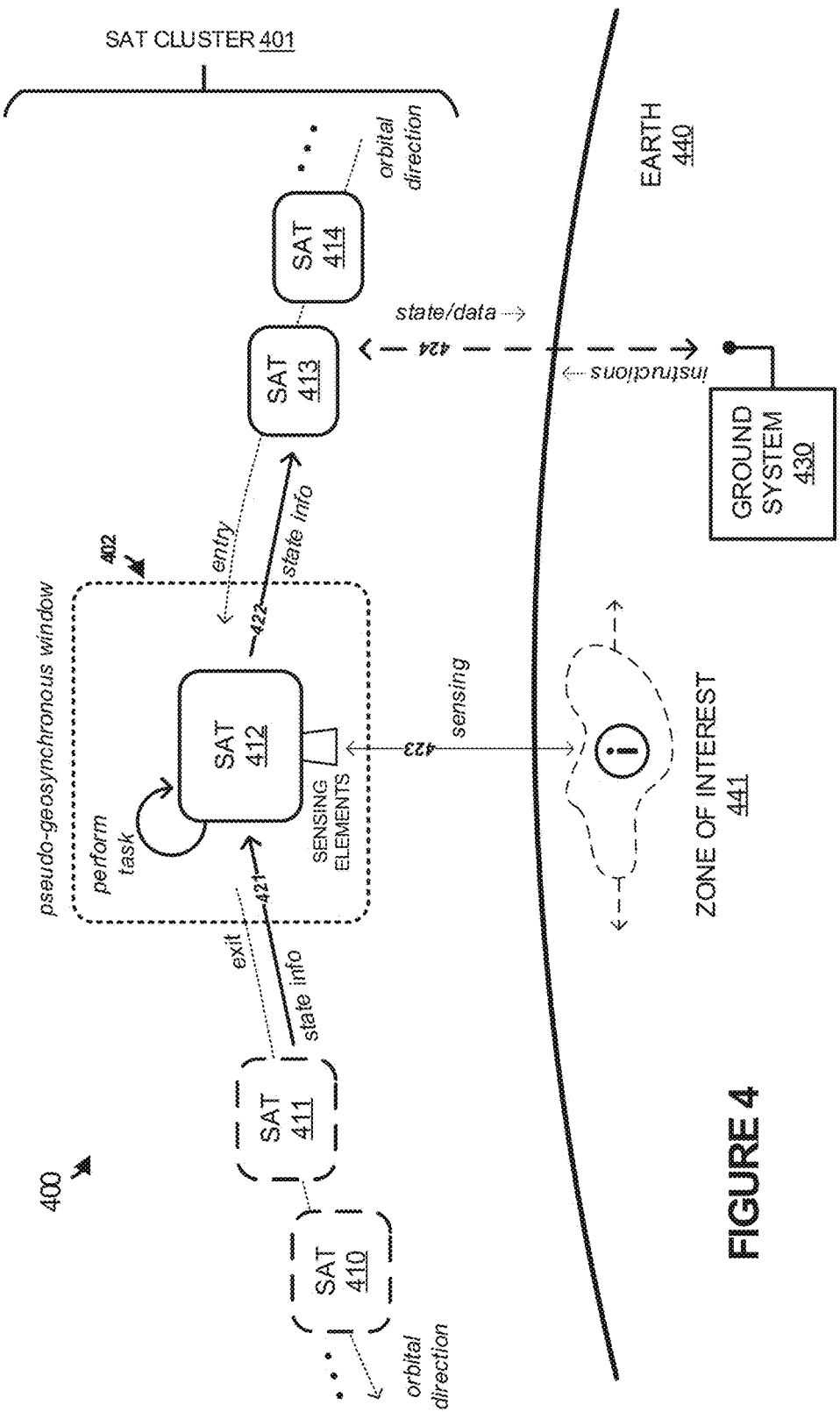
FIG. 4 illustrates a satellite environment according to an implementation.
Figure 5:
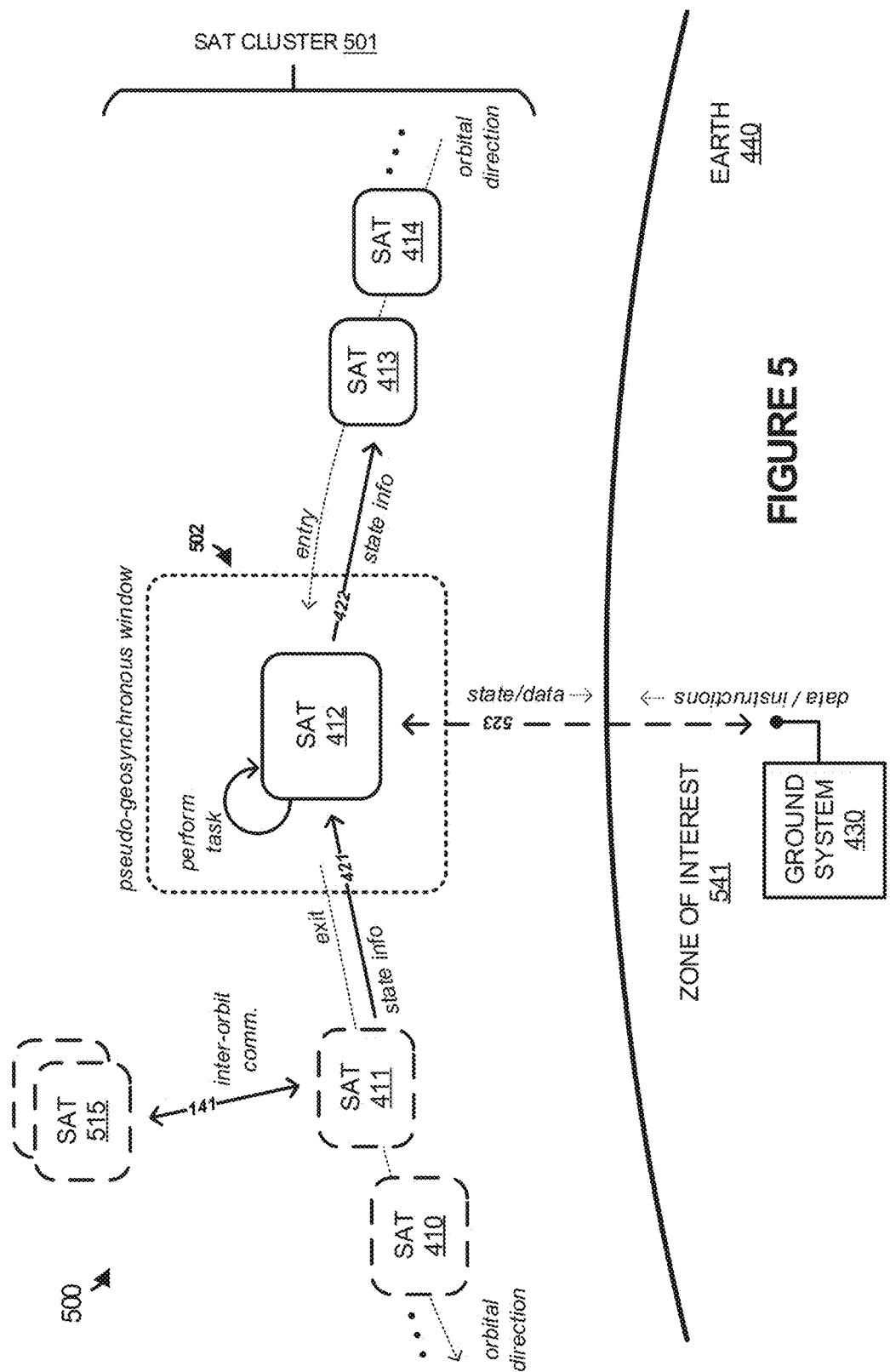
FIG. 5 illustrates a satellite environment according to an implementation.
Figure 6:
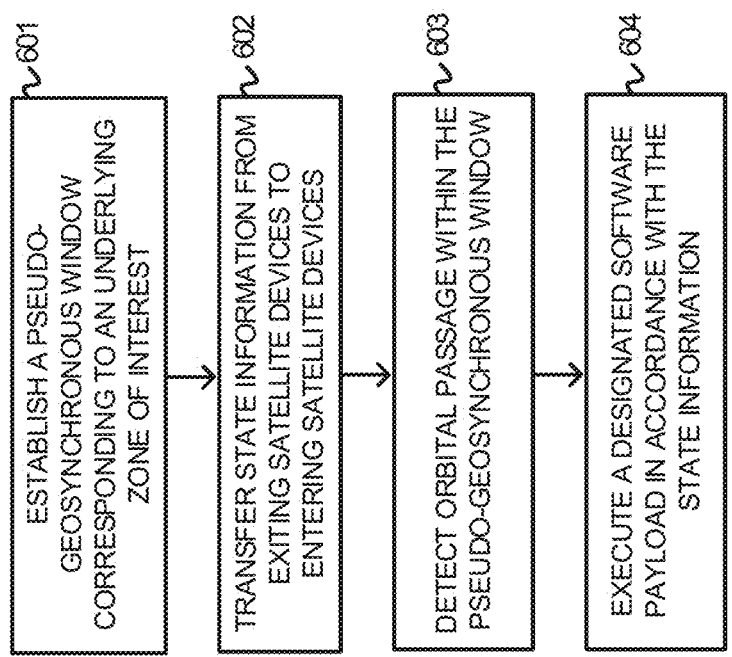
FIG. 6 illustrates operations of pseudo-geosynchronous deployment of satellites according to an implementation.

Turning now to further configurations and operations of satellite clusters and satellite platforms, FIGS. 4-6 are presented. FIGS. 4-6 illustrates establishing pseudo-geosynchronous (or quasi-geosynchronous) windows formed by non-geosynchronous satellite devices. Typically, to achieve geosynchronous monitoring or positioning of a satellite over a planet, such as Earth 440, a geosynchronous orbit (GEO) must be achieved. This geosynchronous orbit is at a much greater distance than low-earth orbiting (LEO) satellites, and has an accompanying difficulty in deployment. Communication latency and throughput also suffer with communications to satellites in geosynchronous orbit. In FIGS. 4-6, a pseudo-geosynchronous operation is achieved using a cluster of satellites in low-earth orbit.

In FIG. 4, a pseudo-geosynchronous window 402 is established to achieve monitoring of a particular zone of interest by a satellite cluster. The zone of interest can be tied to a particular geographic or atmospheric location, point, region, or area, and can be defined in any number of ways, such as geographic coordinates, using one or more global positioning systems (GPS, GLONASS, Galileo), latitude-longitude definitions, or other definitions. The zone of interest can also be defined according to an object of interest that is detected or monitored by the satellite cluster, and the object of interest can experience movement over time. For example, the zone of interest can correspond to a vehicle, animal, person, cloud formation, aircraft, or other motive object, and the zone of interest can be established to track the motive object. The zone of interest can also be defined according to signal strength or communication link properties with ground system 430. For example, a satellite-to-ground link can be established between satellite cluster 401 and a ground communication system using continually shifting satellite devices in LEO. Thus, both static and dynamic zones of interest can be established, and pseudo-geosynchronous operation achieved by members of a satellite cluster in LEO.

FIG. 4 includes satellite environment 400 comprising satellite cluster 401 that includes satellite devices 410-414. FIG. 4 also includes ground system 430, Earth 440, and zone of interest 441. In operation, members of satellite cluster 401 can communicate over one or more communication links, such as those described for layer communications in FIG. 1, although variations are possible. Satellites 410-414 each move in an orbit about Earth 440, and this orbit is illustrated in FIG. 4 using the indicated orbital direction. It should be understood that different orbits and orbital directions can be employed.

As the example in FIG. 4 includes a sensory-based zone of interest 441, a current satellite device is configured to perform sensory measurements, such as a visual, infrared, or ultraviolet imaging, RF imaging or detection, or other sensor-based measurements for the zone of interest. Sensing line-of-sight 423 is indicated in FIG. 4 between a current satellite device and the zone of interest.

To establish the zone of interest, ground system 430 can transfer one or more task instructions to satellite cluster 401 over ground-to-satellite link 424. As with the peer-to-peer communication examples herein, any satellite device can receive the task instructions and distribute the task instructions to other peer satellites, such as peer satellites of a particular orbital layer. As each satellite enters the pseudo-geosynchronous window, state information indicates the task instructions as well as any persistent state transfer from the satellite devices that leave the pseudo-geosynchronous window. The state information can include imaging data, sensor data, processed imaging or sensor data, or other information, such as tracking information, object recognition information, object trajectory information, and other intelligence related to the zone of interest. When the state information comprises sensor data captured by others of the satellite devices during passage through the pseudo-geosynchronous window, further satellite devices passing through the pseudo-geosynchronous window can then capture further sensor data for incorporation into the state information.

Thus, a continual 'chain' of monitoring is achieved for zone of interest 441 using pseudo-geosynchronous window 402. As each satellite device enters pseudo-geosynchronous window 402, the satellite device is configured to begin a monitoring operation indicated by the task instructions or indicated by state information transferred from one or more satellite devices exiting pseudo-geosynchronous window 402. During transit through pseudo-geosynchronous window 402, the associated satellite devices perform one or more tasks indicated by the task instructions or state information, such as monitoring underlying objects, regions, or zones. Responsive to exiting pseudo-geosynchronous window 402, the satellite devices can then transfer state information or task instructions to a further, subsequent, satellite device that is entering pseudo-geosynchronous window 402. Thus, another 'entering' or 'incoming' satellite device resumes the task that is ended by the 'exiting' or 'outgoing' satellite device. The pseudo-geosynchronous window can be established as synchronous to a surface of Earth 440 (or to a motive object thereof) without the actual satellite devices being in a geosynchronous orbit.

The state information or the task instructions can comprise one or more virtual machine images or virtual machine state information. Each satellite device entering the pseudo-geosynchronous window can execute a particular virtual node to perform one or more corresponding tasks. The state information can be used to provision the virtual node, such as to resume a task of a satellite leaving the pseudo-geosynchronous window. In some examples, the state information comprises processed image data for tracking, identifying, and reporting various objects of interest. As each satellite circulates through the pseudo-geosynchronous window, the state information can be sequentially transferred by exiting satellite devices (421) and updated into entering satellite devices (422) to continually monitor zones of interest. These tasks and state information can be achieved using one or more virtual nodes executed by the satellite devices, so that when exiting the pseudo-geosynchronous window, the associated virtual node of a satellite device can transfer an updated state or data to another satellite device which initiates a further virtual node for continuation of the task with respect to a pseudo-geosynchronous window.

Turning now to FIG. 5, a pseudo-geosynchronous window 502 is established for exchanging communications of satellite cluster 501 with ground system 430. A zone of interest 541 can be tied to a particular geographic point, region or area, and can be defined in any number of ways, such as geographic coordinates, using one or more global positioning systems (GPS, GLONASS, Galileo), latitude-longitude definitions, or other definitions. The zone of interest can also be defined according to signal strength or communication link properties with ground system 430. For example, a satellite-to-ground link 423 can be established between satellite cluster 401 and a ground communication system using continually shifting satellite devices in LEO. Thus, both static and dynamic zones of interest can be established, and pseudo-geosynchronous operation achieved by members of a satellite cluster in LEO.

FIG. 5 includes satellite environment 500 comprising satellite cluster 501 that includes satellite devices 410-414. FIG. 5 also includes ground system 430, Earth 440, and zone of interest 541. In operation, members of satellite cluster 501 can communicate over one or more communication links, such as those described for layer communications in FIG. 1, although variations are possible. Satellite devices 410-414 each move in an orbit about Earth 440, and this orbit is illustrated in FIG. 4 using the indicated orbital direction. It should be understood that different orbits and orbital directions can be employed. FIG. 5 also includes satellite devices 515 which might be in a different orbit than satellite devices 410-414, such as a different layer as found in FIG. 1. An inter-orbit or inter-layer communication link 141 can be established for communication with satellite devices 515.

As the example in FIG. 5 includes a communication link-based zone of interest 541, a current satellite device is configured to perform signal strength measurements, RF signal strength or optical signal strength determinations for establishment of pseudo-geosynchronous window 502. Communications line-of-sight link 523 is indicated in FIG. 5 between a current satellite device and the zone of interest. Although a signal strength can be used to establish the pseudo-geosynchronous window, other considerations such as a geographic locations or coordinates of ground system 430 can also be employed to defined the pseudo-geosynchronous window.

To establish the zone of interest, ground system 430 can transfer one or more task instructions to satellite cluster 501 over ground-to-satellite link 523. As with the peer-to-peer communication examples herein, any satellite device can receive the task instructions and distribute the task instructions to other peer satellites, such as peer satellites of a particular orbital layer or to satellite devices 515 of another orbital layer. As each satellite enters the pseudo-geosynchronous window, state information indicates the task instructions as well as any persistent state transfer from the satellite devices that leave the pseudo-geosynchronous window. The state information can include originated data, processed data, network traffic, data packets, network communications, or other information.

Thus, a continual 'chain' of monitoring is achieved for zone of interest 541 using pseudo-geosynchronous window 502. As each satellite device enters pseudo-geosynchronous window 502, the satellite device is configured to begin a communication routing operation indicated by the task instructions or indicated by state information transferred from one or more satellite devices exiting pseudo-geosynchronous window 502. During transit through pseudo-geosynchronous window 502, the associated satellite devices perform one or more tasks indicated by the task instructions or state information, such as routing traffic to ground system 430 over link 523, receiving communications from ground system 430 for routing to satellite devices of cluster 501, or other traffic routing operations. Responsive to exiting pseudo-geosynchronous window 502, the satellite devices can then transfer state information comprising routing instructions, or other task instructions to a further, subsequent, satellite device that is entering pseudo-geosynchronous window 502. Thus, another 'entering' or 'incoming' satellite device resumes the task that is ended by the 'exiting' or 'outgoing' satellite device. The pseudo-geosynchronous window can be established as synchronous to a surface of Earth 440 without the actual satellite devices being in a geosynchronous orbit.

The state information or the task instructions can comprise one or more virtual machine images or virtual machine state information, or routing instructions for a routing or traffic handling virtual node. Each satellite device entering the pseudo-geosynchronous window can execute a particular virtual node to perform one or more corresponding routing/communication tasks. The state information can be used to provision the virtual node, such as to resume a task of a satellite leaving the pseudo-geosynchronous window. As each satellite circulates through the pseudo-geosynchronous window, the state information can be sequentially transferred by exiting satellite devices (421) and updated into entering satellite devices (422) to continually communicate with ground system 430 in zone of interest 541. These routing/communication tasks and state information can be achieved using one or more virtual nodes executed by the satellite devices, so that when exiting the pseudo-geosynchronous window, the associated virtual node of a satellite device can transfer an updated state or routing instructions to another satellite device which initiates a further virtual node for continuation of the task with respect to a pseudo-geosynchronous window. Thus, during the orbital passage within quasi-geosynchronous window 502, each passing satellite device is configured to direct an associated communication system of the passing satellite device to route communications traffic received from other satellite devices in accordance with network routing instructions for exchange of at least a portion of the communications traffic of satellite cluster 502 with a fixed location ground communication system.

FIG. 6 includes further example operations for the elements of FIGS. 4 and 5. In FIG. 6, a satellite cluster establishes (601) a pseudo-geosynchronous window corresponding to an underlying zone of interest. The underlying zone of interest can be defined geographic coordinates, proximity to underlying geographic features, based on tracked objects, based on signal properties of communication link with a ground station, or other definitions. Orbital or spatial positioning of the satellite devices with relation to the zone of interest can be used to define the pseudo-geosynchronous window within the orbit of the cluster of satellites. The plurality of satellite devices of the satellite cluster are configured to determine entry into or exit from the pseudo-geosynchronous window based at least determining overhead proximity to the underlying zone of interest. Entry into and exit from the pseudo-geosynchronous window can be determined by the plurality of satellite devices based at least on determining the overhead proximity in relation to an object of interest that corresponds to the underlying zone of interest, based on signal strength of communications with a ground system corresponding to the underlying zone of interest, or based on other entry and exit criteria, including combinations thereof.

Each satellite device exiting from the pseudo-geosynchronous window transfers (602) state information to entering satellite devices. The entering satellite devices each detect (603) orbital passage within the pseudo-geosynchronous window, and responsively execute (604) a designated software payload in accordance with the state information. The state information can be related to execution of a designated software payload from outgoing satellite devices leaving the pseudo-geosynchronous window for receipt by target satellite devices entering the pseudo-geosynchronous window. In some examples, receipt of the state information by a target satellite device can trigger execution of a virtual node related to the state information. During orbital passage within the pseudo-geosynchronous window, the target satellite devices are configured to execute a designated software payload in accordance with the state information, which might include executing one or more applications as virtual nodes in a virtualized execution system of the satellite device. Responsive to detecting exit from the pseudo-geosynchronous window, outgoing satellite devices configured to determine at least a portion of the state information, and deliver at least the portion of the state information to one or more new target satellite devices. As an alternative to transfer of the state information upon exit by the exiting or outgoing satellite devices, the inbound or entering satellite devices can request the state information responsive to detecting entry into the pseudo-geosynchronous window.

In some examples, the state information comprises routing instructions, and during the orbital passage within the pseudo-geosynchronous window, target satellite devices are configured to route communications traffic received from others of the satellite devices for delivery to the ground system using the routing instructions. The others of the satellite devices are configured to route the communications traffic for delivery to the target satellite devices through zero or more peer satellite devices, depending on how many 'hops' might be necessary to reach the target satellite devices in the pseudo-geosynchronous window. When a subset of the satellite devices orbit in a higher orbital distance from ones of the satellite devices that pass through the pseudo-geosynchronous window, then the subset of the satellite devices can be configured to route communications of the subset for delivery to a ground system via the ones of the satellite devices that pass through the pseudo-geosynchronous window, such as using layer-to-layer communication links.

Figure 7:
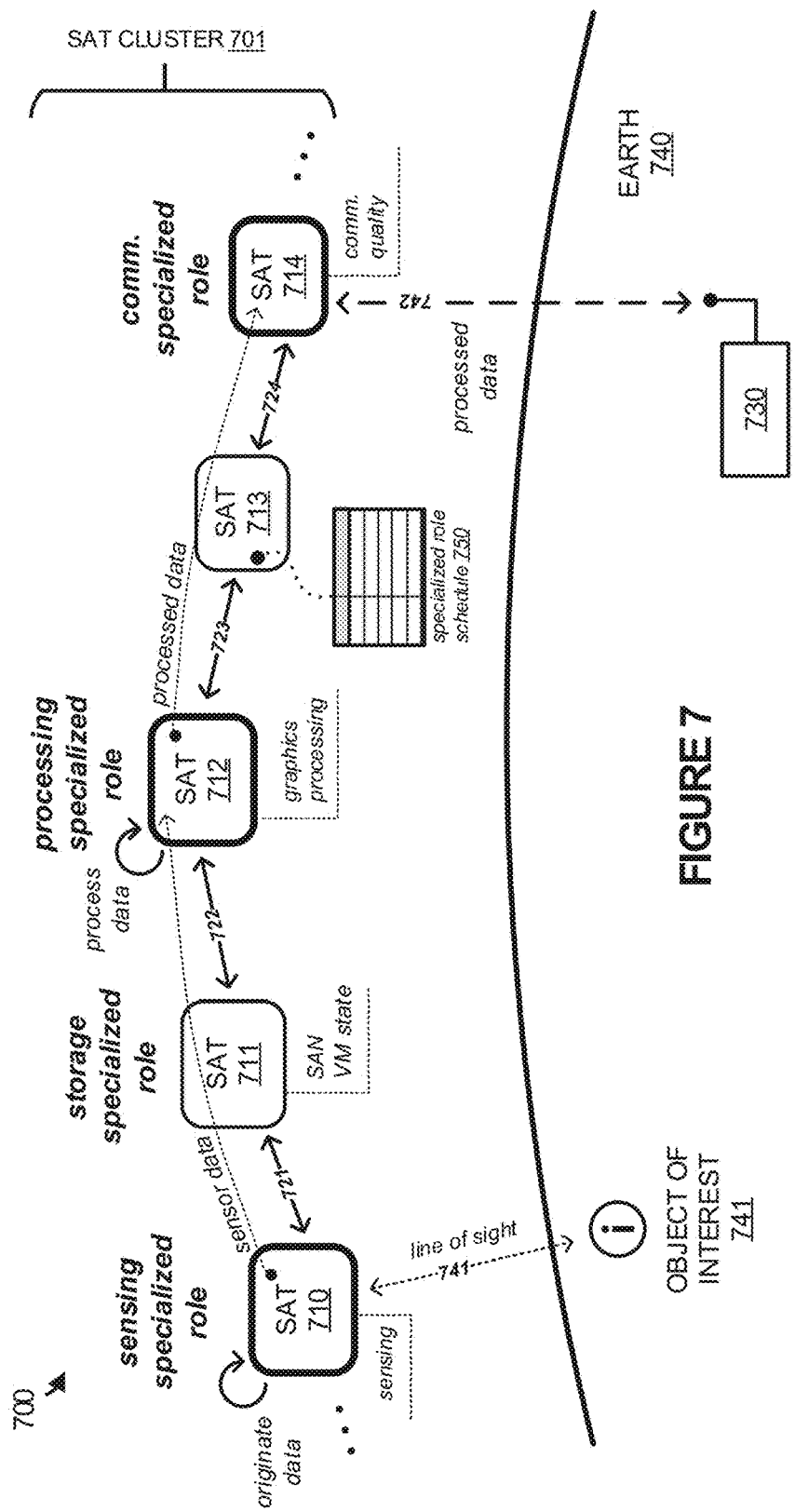
FIG. 7 illustrates a satellite environment according to an implementation.
Figure 8:
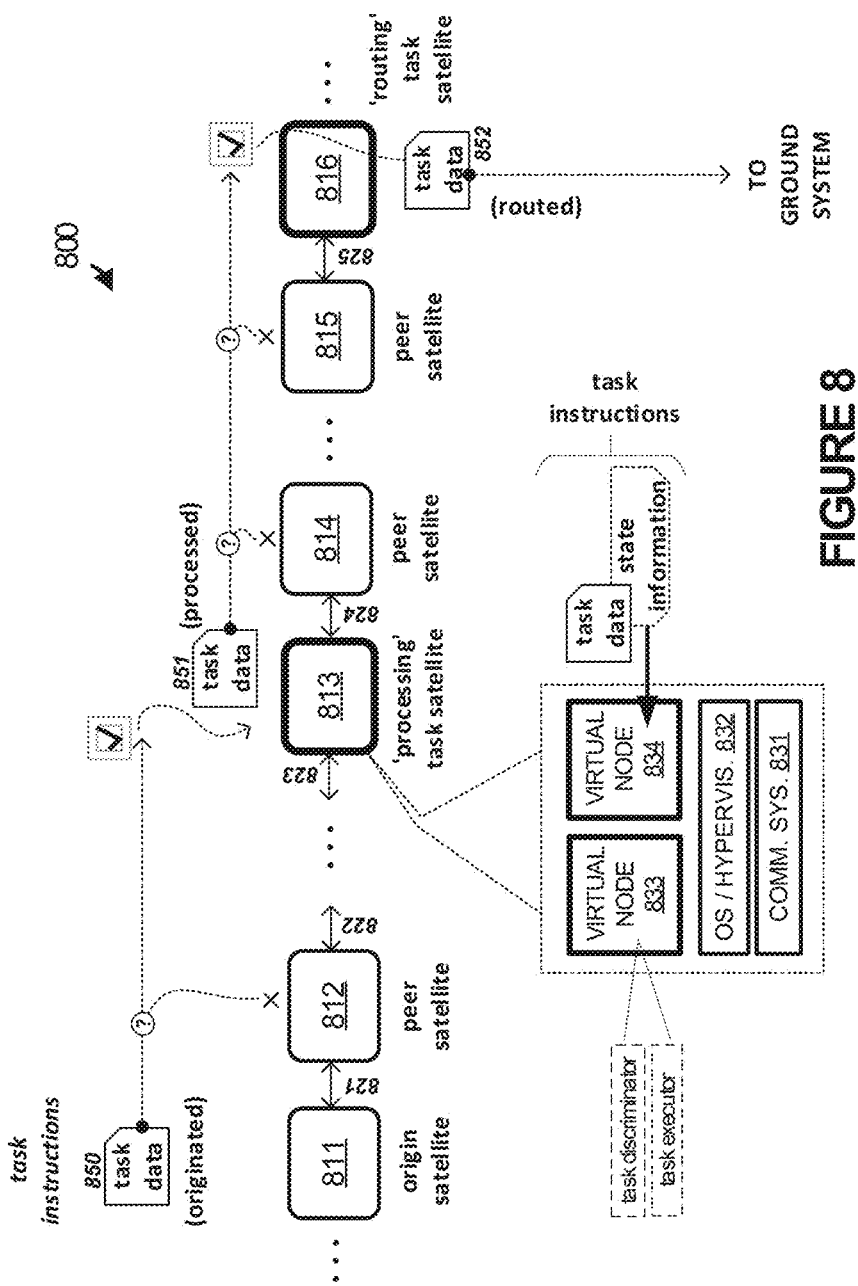
FIG. 8 illustrates a satellite environment according to an implementation.
Figure 9:
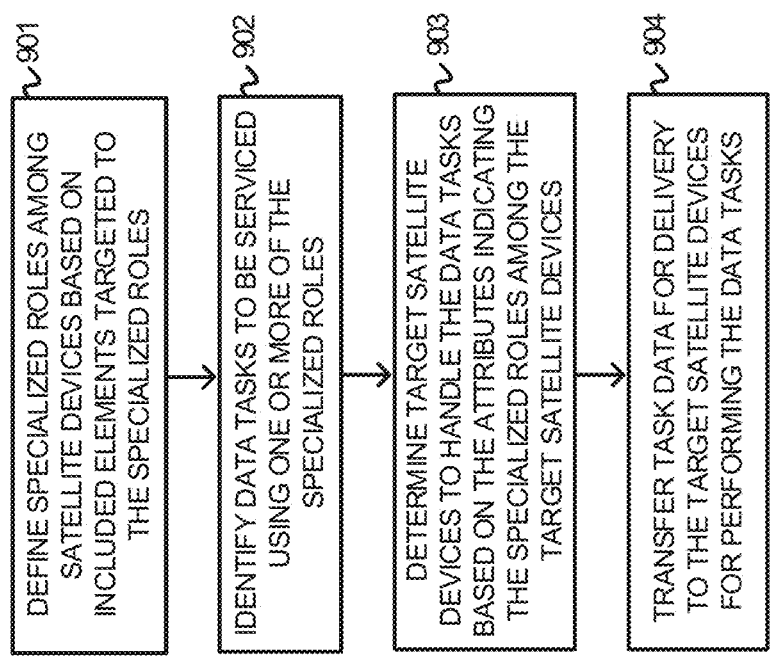
FIG. 9 illustrates operations of specialized role deployment of satellites according to an implementation.

Turning now to FIGS. 7-9, various examples are presented for configuring clusters of satellites to support specialized roles among members of an orbital satellite cluster or orbital satellite platform. Each of the members can be assigned to handle one or more specialized tasks according to a skill set or provisioning configuration of the satellite devices. Peer-to-peer communications are employed to transfer workloads or data among the cluster of satellite devices to reach the various satellite devices configured to perform the specialized tasks. These specialized tasks include data processing tasks, graphics processing tasks, communication tasks, data storage tasks, peer monitoring tasks, sensing tasks, or others, including combinations thereof.

FIG. 7 is a first example that employs specialized tasks in satellite environment 700. Satellite environment 700 includes satellite cluster 701 that comprises a plurality of satellite devices 710-714. Each satellite device is in orbit around Earth 740, and the satellite devices might be included in one or more orbital layers. Ground system 730 can be employed to communicate from one or more ground systems to satellite cluster 701 over link 742.

Communication links 721-724 are established among associated ones of the satellite devices, and each of the satellite devices can act as 'peers' for one another. Communication links 721-724 can form a communication network comprising one or more pathways that might include forward and reverse circulation directions, depending upon the network topology employed. Communication links 721-724 might comprise wireless links which can include one or more RF links or optical links that carry network traffic employing one or more networks or communication protocols. The network traffic can include packetized communications, such as IP communications, among others, including customized communication formats.

Each of satellite devices 710-714 can have one or more designated roles which are specialized to a particular task or tasks. These roles can include those mentioned above, as well as a data processing role, a data storage role, an imaging role, a satellite-to-ground communication role, and a virtualized software execution role. The specialized roles can be based on provisioning properties or versioning properties among hardware elements and software elements of each of the satellite devices.

For example, a first satellite device might include a graphics processing unit (GPU) that can handle a higher level of graphics data processing, while a second satellite device might lack a GPU but include a specialized software package for processing image data to perform object tracking or object recognition. Imaging data might be passed from a source satellite device 710 that captures line-of-sight imaging data 741 to another satellite device with a GPU 712 that can process the imaging data to apply one or more digital filters or other pre-processing steps, and then yet another satellite device can receive the pre-processed imaging data to perform object recognition processes on that data. A final satellite device 714 might have a communication role for satellite-to-ground communications based on appropriate communication circuitry, antenna arrangements, or proximity to ground station 730. This final satellite can receive the processed imaging data after the GPU processing or object recognition process has been completed, and transfer for delivery to ground station 730 for further routing to other network nodes, servers, storage systems, distributed computing platforms—possibly over one or more packet networks to terrestrial destinations. Instead of transferring to ground station 730, a storage-specific satellite device 711 might be employed to store the imaging data or processed imaging data for later transfer to other systems or for later comparison with other imaging data for object tracking, time-lapsing, video capture, or related processes. In further examples, the storage role satellite device 711 might be employed to store virtual machine images, software payloads, applications, or virtual machine execution state information for provisioning to other satellite devices.

The satellite devices of satellite cluster 701 can be configured to identify one or more target satellite devices among satellite devices of satellite cluster 701 to handle specialized tasks based in part on an attribute scoring metric determined for the satellite devices. The attribute scoring metric can indicate competency ratings for each of the target satellite devices for at least a portion of the specialized roles. As one example, specialized role schedule data structure 750 is shown in FIG. 7 for exemplary satellite device 713, and each satellite device can include similar data structures. This data structure can indicate identifiers or identities of each of the satellite devices in satellite cluster 701 in a first column, and then in a second and further columns indicate competency scores for a variety of specialized roles, such as those mentioned herein. When a satellite device desired to employ a specialized role, then that satellite device can consult schedule 750 to select which satellite devices are best suited for the specialized data or communication task. Data, communications, state information, or task instructions can then be transferred for delivery to the selected satellite device or devices. This transfer can occur over one or more peer-to-peer satellite likes, such as links 721-724 in FIG. 7. In further examples, a data structure like schedule 750 might not be employed to identify or select specific satellite devices. Instead, a satellite device might transfer the data, communications, state information, or task instructions for delivery to any satellite device in a broadcast manner, and a satellite device that matches a specified role indicated in the task instructions can responsively take action based on receiving the data, communications, state information, or task instructions, while other satellite devices might ignore the transfer.

FIG. 8 is a further example of role specialization among satellite devices of a satellite cluster. Satellite configuration 800 includes a plurality of satellite devices 811-816, each communicatively coupled by one or more communication links 821-825. In operation, one or more among satellite devices 811-816 can have specialized roles assigned or designated. These roles can be established based on software or hardware elements included in each of satellite devices 811-816.

When software elements define the specialized roles, the roles can be established based on which virtual machine images are currently resident on each satellite device, software revisions currently updated on each satellite device, or properties other software elements currently present on each satellite device 811-816. When hardware elements define the specialized roles, the roles can be established based on hardware elements, circuitry, processing elements, communication elements, transmitter or receiver properties, antenna configurations, antenna alignments or properties, data storage devices or capacities, data processing capabilities, data processing speeds, data processing availability or utilization levels, communication bandwidth, communication frequencies, communication signal strengths, sensor types, sensor capabilities, sensor availability, sensor alignment, satellite positioning, or other properties related to presence of hardware elements or current functionality of hardware elements.

Example satellite device components are shown for satellite device 813, and these can be included in any of satellite devices 811-816. Satellite device 813 includes one or more virtual nodes executed by a virtualized execution system of satellite device 813 provided by operating system (OS)/ hypervisor 832 and various processing system and memory device elements not shown for clarity. Furthermore, a communication system 831 is included for peer-to-peer communication among satellite devices, or for satellite-to-ground communications in some examples. A virtual node can be configured as a task execution system to handle the specialized task handling, which might include elements such as a task discriminator and task executor. The task discriminator can determine if an inbound task is mean for the particular satellite devices that receives the task, as well as determine which satellite devices of the cluster have specialized roles, perform scoring or ranking of the competencies among satellite devices with respect to the specialized roles, among other features. The task executor can handle local execution of the specialized tasks when directed to the particular satellite device. This local execution might include spawning or initiating one or more additional virtual nodes to perform the task, monitoring the task performance and completion, and transferring data or state information for delivery to another task or satellite device upon completion. When configured as a satellite-to-ground routing specialized role, task executor might operate as a network traffic router or bridge for exchanging network traffic with a ground system, with satellite devices of another orbital layer, or other communication endpoints.

Each of the satellite devices of FIG. 8 can include a communication system configured to receive task descriptions from at least one peer satellite device, and a task execution system configured to identify specialized roles indicated by the task descriptions and determine if the satellite device supports the specialized roles based at least on a current provisioning of software elements and hardware elements. Based at least on the satellite device supporting one or more of the specialized roles, the task execution system is configured to execute one or more tasks in accordance with associated task descriptions. Based at least on the satellite device not supporting the one or more of the specialized roles, the task execution system configured to instruct the communication system to transfer the associated task descriptions for delivery to a further peer satellite device. As mentioned above, the task instructions or task data might comprise state information related to execution of virtual nodes by the task execution system of a satellite device. In these examples, based at least on a satellite device supporting the one or more of the specialized roles, the associated task execution system can be configured to execute one or more software applications as associated virtual nodes according to the state information.

In a specific example, origin satellite 811 can originate data for processing by another satellite device with a role specialized to the type of data processing desired for the data originated by satellite 811. Satellite 811 can transfer this task data 850, along with any associated task instructions, for delivery to the specialized satellite device—namely satellite device 813. Satellite device 813 can receive task data 850, determine that the task data is meant for processing by satellite device 813, and being a data processing task commensurate with any task instructions that accompany task data 851. The task data might include imaging data for which additional graphics processing is desired by satellite device 811, and thus satellite device 813 can perform this additional graphics processing. Other examples of specialized roles can be employed, such as communication routing, data storage, software provisioning, virtual machine image or state distribution, among others.

Once satellite device 813 has completed the associated data processing on task data 850, the task instructions might indicate that the processed data is to be returned to satellite device 811. However, in this example, the task instructions indicate that the processed data is to be transferred for delivery to a ground system. Satellite device 813 can identify a satellite device of the cluster which has a specialized role of ground communications, and transfer the processed data as further task data 851 for delivery to that satellite device—namely satellite device 816. It should be noted that task data 850 and task data 851 can pass through one or more peer satellite devices en route to the destination satellite devices. These peer satellite devices can be members of a communication network, such as those described in FIG. 1 for forward/reverse circulating network configurations. Since the peer satellite devices are either not identified as a destination in the task instructions, or lack the specialized roles, these peer devices continue to transfer the task data to further peer devices. The task instructions might include one or more network packets with addressing information or header information that indicates a particular satellite device or task role desired for the accompanying task data. The task data might be included in payload portions of the network packets. Responsive to receiving further task data 851, satellite device 816 can determine that task data 851 (or as indicated by accompanying task instructions) is to be routed to a ground system by satellite device 816. Satellite device 816 can then route task data 852 for delivery to the ground system and further distribution of the processed data to terrestrial computing systems.

FIG. 9 is a further example of operation for specialized roles in clustered satellite devices of FIG. 8. In FIG. 9, cluster 800 defines (901) specialized roles among satellite devices based on included elements targeted to the specialized roles. Each of the satellite devices identifies (902) data tasks to be serviced using one or more of the specialized roles, and determines (903) target satellite devices to handle the data tasks based on attributes indicating the specialized roles among the target satellite devices. The selection of target satellite devices can be made based in part on an attribute scoring metric determined for the target satellite devices, where the attribute scoring metric indicates competency ratings for each of the target satellite devices for at least a portion of the specialized roles. The satellite devices then transfer (904) task data, along with any associated task instructions, for delivery to the target satellite devices for performing the data tasks.

In some examples, the task data or task instructions comprise state information related to execution of virtual nodes by the satellite devices, and the target satellite devices include virtualized execution systems configured to receive the state information and execute one or more software applications as virtual nodes according to the state information. Furthermore, individual ones of the satellite devices can be further configured to transfer the task data and task instructions through one or more peer satellite devices of the satellite cluster to reach the target satellite devices. Responsive to receiving the task data, each associated peer satellite device can be configured to evaluate a received task data against one or more attributes of the associated peer satellite device to determine if the associated peer satellite device should act in accordance with the task data or transfer the task data to at least one further peer satellite.

Figure 10:
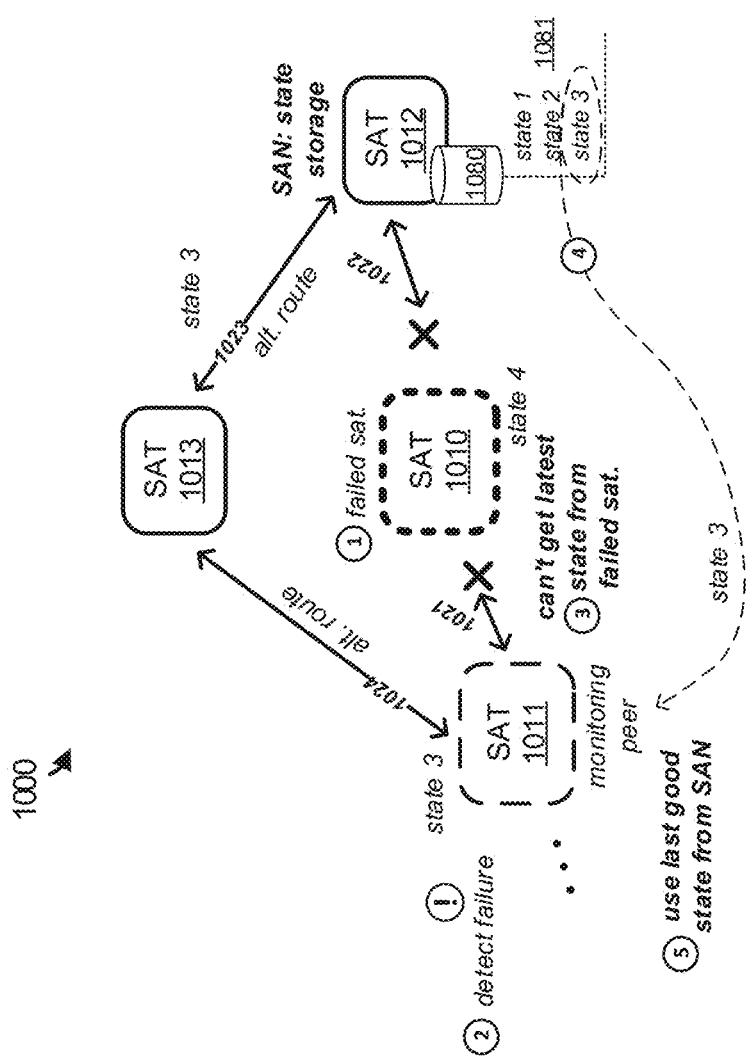
FIG. 10 illustrates a satellite environment according to an implementation.
Figure 11:
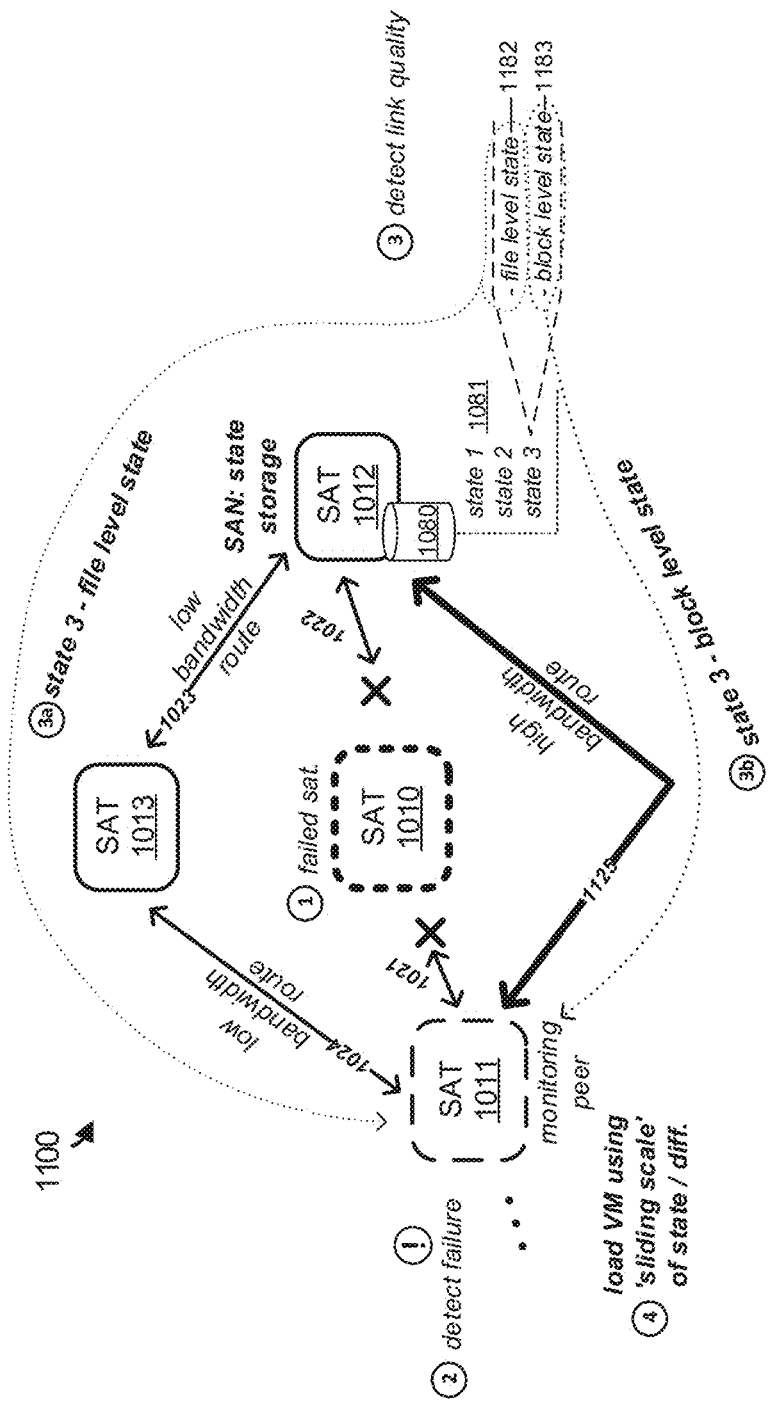
FIG. 11 illustrates a satellite environment according to an implementation.
Figure 12:
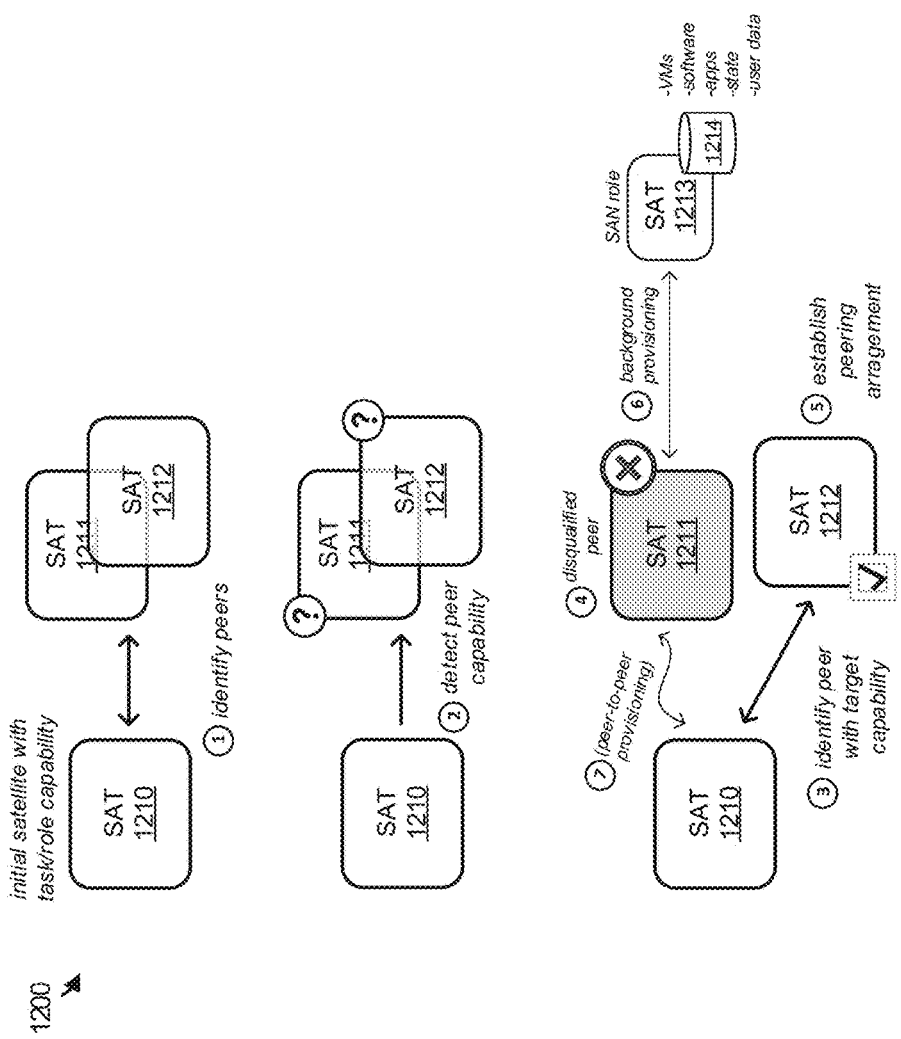
FIG. 12 illustrates peering satellite operations according to an implementation.

Turning now to FIGS. 10-12, these Figures detail various examples of state transfer among satellite devices of an orbital satellite cluster or orbital satellite platform. The state transfer can be facilitated using a storage-area-network (SAN) based configuration, where at least one satellite device of the satellite cluster can include one or more data storage systems for storing state information related to execution of virtual nodes by other satellite devices. However, in satellite systems, bandwidth of inter-satellite communications might be limited or unreliable. Moreover, communication with ground systems can be intermittent and low-bandwidth. Thus, the various examples in FIGS. 10-12 include enhanced operations for handling state transfer among satellite devices in a satellite cluster, where bandwidth-limited operations might be encountered.

In ground-based virtualized execution systems, virtual machines or virtual nodes might be 'booted' from a remote source, such as from a distant server over a high-speed network link. These high-speed links might include gigabit Ethernet or faster configurations which allow for high-bandwidth and real-time transfer of virtual machine images or virtualized containers as-needed for booting virtual machines or virtual nodes. However, in space-based systems, such as satellite clusters or platforms, links are typically wireless (RF or optical) and are typically less reliable, lower bandwidth, and may be intermittent depending on ambient radiation conditions, satellite orientation, distance, passage over signal horizons, line-of-sight challenges, or due to other considerations. Moreover, transfer of virtual machine or virtual node information from ground systems might not always be achievable due to lack of line-of-sight with an associated ground system by many of the satellite devices of the cluster. Motion of the satellites themselves can also complicate these transfers. Thus, it can be difficult to provision virtual machine images and other virtual node state information among orbiting satellites.

FIG. 10 is a first example configuration for state transfer among satellite devices. In FIG. 10, system 1000 is presented that includes a plurality of satellite devices, such as satellite devices 1010-1013. These satellite devices can be deployed into one or more orbital configurations, such as a layered configuration illustrated in FIG. 1. A circulating network can be formed among the satellite devices, or a point-to-point communication scheme might instead be employed. However, for the purposes of the example in FIG. 10, satellite device 1011 does not have a direct communication path to satellite device 1012, and must communicate through one or more peer satellite devices. Communication links 1021-1024 forms a peer-to-peer communication network, and each link can comprise any of the wireless communication links discussed herein.

In operation, satellite device 1010 is configured to perform one or more tasks, such as by executing one or more applications using virtual nodes in a virtualized execution system. Periodically, satellite device 1010 updates current state of the virtual nodes with satellite 1012 that acts as a part of a storage area network (SAN) for the satellite cluster. Satellite 1012 can receive the periodic state updates and stores the state updates using storage system 1080 comprising one or more non-transitory computer-readable media, such as solid state media, flash memory, magnetic media, phase change media, resistive memory, or other storage media. In FIG. 10, state updates 1081 can be stored incrementally, or in a replacement manner.

Satellite device 1011 is configured as a backup satellite device for satellite device 1010 in case or error, malfunction, or failure of satellite device 1010. This backup by satellite 1011 can include resuming one or more tasks being performed by satellite device 1010 after detection of an issue with satellite device 1010. However, satellite device 1011 can only resume the task being performed by satellite device 1010 if current state information is able to be transferred to satellite device 1011 from either satellite 1010 or satellite 1012 which stores the state updates.

In FIG. 10, an example operation is provided to handle this state transfer. Initially, satellite device 1010 performs one or more tasks using virtual nodes as discussed herein. State updates related to the execution of the virtual nodes is updated to specialized storage satellite device 1012 over link 1022. Satellite device 1011 monitors for failures of satellite device 1010. This monitoring can instead be performed by satellite device 1012 in other examples. In FIG. 10, satellite device 1012 becomes unreachable over links 1021 and 1022, and thus a failure is determined to be occurring. Responsive to this detected failure, satellite device 1011 can attempt to get current state information for resuming a task of satellite device 1010. However, since links 1021-1022 are no longer functioning, satellite device 1011 receives this state information from satellite device 1012 over an alternate route, namely links 1023-1024, and though peer satellite device 1013. In one example, further updated state information was available in satellite device 1010 but never transferred for storage by satellite device 1012, namely 'state 4' in FIG. 10. Thus, only the latest 'state 3' is available for transfer to satellite device 1011. Once this 'state 3' is received, satellite device 1011 can initiate one or more virtual nodes according to the state information and resume one or more tasks of satellite device 1010.

FIG. 11 illustrates a further example of the elements of FIG. 10, namely in system 1100 that also include satellite devices 1010-1013 communicating over associated links 1021-1024. However, FIG. 11 adds high-bandwidth link 1125 and designates links 1023-1024 as low-bandwidth links. The bandwidth of each of these links can vary in time due the present conditions and other factors mentioned herein. However, once a bandwidth determination has been made for each of the links, a predetermined threshold bandwidth level can be used to determine a level of "statefulness" to transfer to backup satellite devices which acts as a monitoring peer for satellite devices 1010.

The level of statefulness can correspond to level of detail or description indicated in a state information transfer. In one example, a block-level state transfer can be provided, where a block-level representation of changes to a virtual node are described in the state information. In another example, a file-level state transfer can be provided, where a data file-by-file representation of changes to a virtual node is described in the state information. Typically, the file-level statefulness requires less bandwidth to transfer to a satellite device, however this file-level statefulness may not provide a level of detail needed to perfectly replicate a virtual node or virtual machine execution state. A block-level statefulness, on the other hand, can comprise a more complete replication of the execution state of a virtual node or virtual machine, but requires more bandwidth to transfer among satellite devices.

In FIG. 11, an example operation is provided to handle this state transfer. Initially, satellite device 1010 performs one or more tasks using virtual nodes as discussed herein. State updates related to the execution of the virtual nodes is updated to specialized storage satellite device 1012 over link 1022. Satellite device 1011 monitors for failures of satellite device 1010. This monitoring can instead be performed by satellite device 1012 in other examples. In FIG. 11, satellite device 1012 becomes unreachable over links 1021 and 1022, and thus a failure is determined to be occurring. Responsive to this detected failure, satellite device 1011 can attempt to get current state information for resuming a task of satellite device 1010. However, since links 1021-1022 are no longer functioning, satellite device 1011 receives this state information from satellite device 1012 over an alternate route.

However, in FIG. 11, the alternative route can include either links 1023-1024 though peer satellite device 1013, or a more direct route over link 1125. In this example, link 1125 is considered high-bandwidth and capable of transferring a block-level state 1183 stored by satellite device 1012, while links 1023-1024 are considered low-bandwidth and not capable of transferring a block-level state 1183 to satellite device 1011 from satellite device 1012 in a timely manner. Instead of transferring the block level state 1183, satellite device 1012 might elect to send the lower-intensity but less accurate file-level state 1182 for delivery to satellite device. The various bandwidths, thresholds, and timeliness factors can vary and be based on predetermined levels, predetermined time delays to resume operation of a failed satellite device, or other factors.

A storage platform based in satellite device 1012 (i.e. elements of storage system 1080) can be executed as one or more virtual nodes on a virtualized execution system of satellite device 1012 and configured to select a level of statefulness for delivery of the state information to peer satellite device 1011 designated as an operational backup for the active satellite device 1010. This level of statefulness can be selected based at least on a communication link quality between the satellite device and the peer satellite device. For example, based at least in part on the communication link quality falling below a predetermined threshold, the storage platform can be configured to transfer file-level state information for delivery to the peer satellite device over links 1024-1023 and peer satellite device 1013. Based at least in part on the communication link quality exceeding the predetermined threshold, the storage platform can be configured to transfer block-level state information for delivery to the peer satellite device over high-bandwidth link 1125.

Once satellite device 1011 receives the state information transferred by satellite device 1012, satellite device 1011 can begin executing one or more virtual nodes to resume tasks of satellite device 1010. However, the state information might be incomplete to fully define a virtual node or virtual machine, especially in the file-level state transfer in bandwidth-limited scenarios. Responsive to receiving file-level state information, satellite device 1011 can be configured to resume the activity of the active satellite device by at least performing a differential update of a virtual machine image already resident on satellite device 1011 using the file-level state information.

The differential update can differentially patch files or replace files inside a virtual node or virtual machine so as to recreate a block-level state using only a portion of the data that would normally accompany a block-level state transfer. However, a base level of provisioning should exist in satellite device 1011 before the file-level differential patching can occur. Thus, satellite device 1011 might be pre-provisioned with a baseline virtual machine image, virtual node, container, or other virtualized data entity that can be later patched in a differential manner to boot the virtualized data entity and resume operation of satellite device 1010 according to the latest state information available.

Satellite device 1011 might be selected as a backup to satellite device 1010 based in part on a current provisioning level or based on current provisioning attributes available to support execution of the virtual node to be resumed. The provisioning attributes might comprise version levels of one or more virtual machine images resident on the peer satellite device, or might comprise specific applications needed to execute one or more tasks according to the transferred state information. Responsive to one or more of the satellite devices lacking the provisioning attributes to support execution of the active virtual node, at least one among active satellite device 1010 and storage satellite device 1012 can be configured to update a software portion of the one or more of the satellite devices to include the provisioning attributes to support execution of the active virtual node. Once the software portion is updated, such as to update a baseline virtual machine image, application version, or other software element, then the associated updates satellite device can be slated for backup satellite device to satellite device 1010. A differential update can be performed responsive to failures of satellite device 1010.

Although the preceding discussion is related to backup operations for an active satellite device, the operations for differential state transfer based on a current level of software provisioning can be applied to the other examples herein. For example, specialized roles among satellites can be defined according to provisioning attributes of particular target satellite devices that are available to support execution of a virtual node on those target satellite devices. State transfer during the task transfer processes can include a differential updating of the baseline virtual machine already found on the target satellite devices. The differential updating can be based on block-level or file-level transfers.

FIG. 12 includes further examples of state transfer operations 1200 among satellite devices for updating baseline provisioning of software elements of satellite devices. In FIG. 12, an initial satellite device 1210 is designated with a task/role capability, such as the specialized tasks or specialized roles presented herein. This satellite device might want to identify one or more peer satellites to act as backup satellite devices in case of failure, malfunction, or errors of the initial satellite device 1210. In FIG. 12, satellite devices 1211-1212 are initially identified as candidate backup satellite devices.

Satellite device 1210 detects capabilities of these candidate satellite devices 1211-1212, such as a level of software provisioning, attributes related to virtual node execution, software versions, operating system versions, kernel versions or patch levels, or other software provisioning capabilities. In FIG. 12, satellite device 1211 is disqualified as lacking one or more provisioning capabilities, while satellite device 1212 is identified as satisfying the one more provisioning capabilities. Satellite device 1210 can then establish a peering/backup arrangement with satellite device 1212, where satellite device 1212 monitors for failures of satellite device 1210 and resumes operation of one or more tasks of satellite device 1210 using various state information, such as described above.

However, background provisioning of satellite device 1211 might be desirable, such as to have a further backup or to increase the capabilities of satellite device 1211 to support future operations. Thus, either satellite device 1210 or another satellite device can begin a background provisioning updated to satellite device 1211 to bring satellite device 1211 into alignment with one or more provisioning capabilities. In one example, a storage-centric satellite device 1213 can be employed that stores baseline provisioning information in storage system 1214. Satellite device 1213 can update software elements of satellite device 1211. As shown in FIG. 12, these software elements might include virtual machine images, software, applications, state information, or user data, among other data or software elements. Once satellite device 1211 has been provisioned to a sufficient level, satellite device 1211 might be designated as a backup satellite device for satellite device 1210 to achieve further operational redundancy for satellite device 1210.

These operations can be advantageous when a new application or task is uploaded to a satellite cluster from a ground station, and not all members of a satellite cluster have been provisioned with the software elements to support that application or task. In this manner, a software application or task can be deployed over time to members of a satellite cluster while satellite devices can begin these new operations once achieving a provisioning level. Moreover, since satellite devices are typically deployed in an orbital configuration, a software payload might be transitioned from one satellite device to another satellite device as needed or last-minute to support a specialized task corresponding to a zone of interest. This last-minute provisioning can ensure that satellite devices are provisioned with software elements prior to entering a pseudo-geosynchronous window so that a state transfer from an exiting satellite device can find appropriate software elements already resident on the entering satellite devices to perform a designated task within the pseudo-geosynchronous window.

Furthermore, when a layered orbital arrangement is employed, a first set of satellite devices might be in a lower orbital layer than a second set of satellite devices. At least one of the satellite devices orbiting in the lower orbital layer might comprise a virtualized execution system configured to maintain associated state information related to execution of virtual nodes. A communication network among the satellite devices can be configured to transfer the associated state information over the communication network for delivery to at least one peer satellite device orbiting in the second orbital layer and configured as a backup to the at least one of the satellite devices. These enhanced provisioning techniques can be applied to the layered arrangements, where only a first orbital layer has a line-of-sight established with a ground communication system that initially provides software payloads for deployment among the satellite cluster. Once a first layer has been provisioned with the software payloads, then a further layer can be provisioned for deployment of the software payloads over that further layer.

Figure 13:
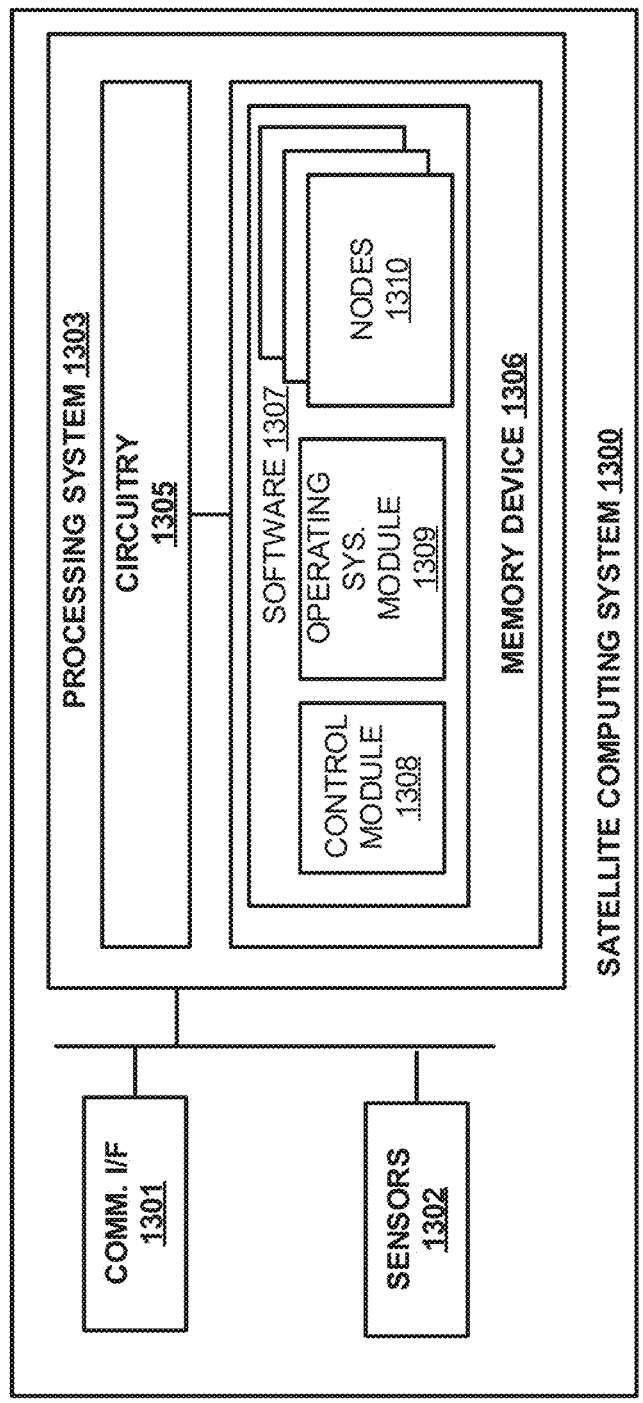
FIG. 13 illustrates a satellite computing system to provide a virtualized satellite application platform according to an implementation.

FIG. 13 illustrates a satellite computing system 1300 to provide a virtualized satellite application platform according to an implementation. Computing system 1300 is representative of any computing system or systems with which the various operational architectures, processes, scenarios, and sequences disclosed herein for a satellite device may be implemented. Computing system 1300 can be an example of a satellite device from any of the preceding Figures, although other examples may exist. Computing system 1300 comprises communication interface 1301, sensors 1302, and processing system 1303. Processing system 1303 is linked to communication interface 1301 and sensors 1302. Sensors 1302 may comprise imaging sensors, heat sensors, light sensors, or some other similar type of sensor. Processing system 1303 includes processing circuitry 1305 and memory device 1306 that stores operating software 1307. Computing system 1300 may include other well-known components such as a battery, solar panels, and enclosure that are not shown for clarity.

Communication interface 1301 comprises components that communicate over communication links, such as network cards, ports, radio frequency (RF) circuitry, optical signaling circuity, processing circuitry and software, or some other communication devices. Communication interface 1301 may be configured to communicate over wireless links which use air or space as the communication medium. The wireless links can comprise any wireless electromagnetic communication, such as RF communications, VHF communications, UHF communications, microware communications, optical communications (e.g. visible, infrared, or ultraviolet), and combinations thereof. Communication interface 1301 may be configured to use optical signaling, Internet Protocol (IP), IEEE 802.11 WiFi, among various wireless protocols, communication signaling, or some other communication format, including combinations thereof. In some implementations, communication interface 1301 may communicate with one or more other satellites in a satellite platform and communicate with a ground control system.

Processing circuitry 1305 comprises microprocessor and other circuitry that retrieves and executes operating software 1307 from memory device 1306. Memory device 1306 may include volatile and nonvolatile, removable and non-removable media implemented in any method or technology for storage of information, such as computer readable instructions, data structures, program modules, or other data. Memory device 1306 may be implemented as a single storage device, but may also be implemented across multiple storage devices or sub-systems. Memory device 1306 may comprise additional elements, such as a controller to read operating software 1307. Examples of storage media include random access memory, read only memory, magnetic disks, optical disks, and flash memory, as well as any combination or variation thereof, or any other type of storage media. In some implementations, the storage media may be a non-transitory storage media.

Processing circuitry 1305 is typically mounted on a circuit board that may also hold memory device 1306 and portions of communication interface 1301 and sensors 1302. Operating software 1307 comprises computer programs, firmware, or some other form of machine-readable program instructions. Operating software 1307 includes control module 1308, operating system module 1309, and nodes 1310, although any number of software modules may provide the same operation. Operating software 1307 may further include utilities, drivers, network interfaces, applications, or some other type of software. When executed by processing circuitry 1305, operating software 1307 directs processing system 1303 to operate computing system 1300 as described herein.

In at least one implementation, virtual nodes 1310 may be deployed to satellite computing system 1300 that represent full operating system virtual machines or containers, wherein each node is configured to provide a particular application. To run the nodes, operating system module 1309, which may comprise an operating system and/or a hypervisor, may be executed by processing system 1303, wherein operating system module 1309 provides a platform for nodes 1310. In some implementations, in providing the platform, operating system module 1309 may be configured with a resource schedule, which allocates processing resources, communication resources, and sensor resources to each node in nodes 1310. This allocation of resources, may comprise time division allocation of resources, such as providing a first application with access to a user sensor for a first time period and providing a second application with access to the same user sensor for a second time period, and may further include physical sharing of resources, such as providing one or more cores to a first virtual node and providing one or more secondary cores to a second virtual node.

In addition to executing the applications for each of virtual nodes 1310, operating system module 1309 may further provide a platform for state determination and distribution. This state determination may permit processing system 1303 to identify states for each of the applications and share the states with other satellites and the ground control system. The states may include the operational state of processes within each application node, and/or data states for each of the application nodes. The states may be used in recovery of the various applications executing on satellite computing system 1300, and may further be used in providing enhanced data operations for the applications. For example, an application executing as a node on satellite computing system 1300 may communicate data to a second satellite node. This satellite node may identify second data, using sensors on the second satellite, and combine the data from the first satellite with the second data to provide a particular operation. This operation may include imaging analysis in some examples, where the application can determine whether an object is moving, the type of object, the rate of movement in the object, or some other similar determination based on the combined data.

As an illustrative example, satellite computing system 1300 may use one or more imaging sensors or an imaging system in sensors 1302 to establish state information related to imaging data gathered by the imaging sensors. Once identified, the state information may be communicated to a second satellite device, wherein the second satellite device may employ second imaging sensors to modify the state information with at least imaging data captured by the second imaging sensors. This modification may include positional tracking of at least one underlying object of interest, or may include a refining analysis of the state information based on the imaging data captured by the second imaging sensors to act as a recognition process for at least one underlying object of interest.

In some examples, in addition to or in place of exchanging the state information to provide additional analysis on the sensor data, the state information may also be used to provide a backup of satellite computing system 1300. In particular, the state information may be shared with a second satellite device permitting the second satellite device to implement one or more virtual nodes from satellite computing system 1300 when a failure is detected. This implementation or establishment of the one or more virtual nodes may occur directly at the satellite receiving the state information from satellite computing system 1300, or may occur on a third satellite configurable by the satellite receiving the state information from satellite computing system 1300.

Although illustrated in the previous example as providing information to other satellites, it should be understood that satellite computing system 1300 may also be configured to receive state information from other satellites and provide similar operations in accordance with the received state information. These operations may include modifying the state information based on sensors for satellite computing system 1300, or providing backup peering operations based on the state information provided from the secondary satellites.

As also illustrated in FIG. 13, satellite computing system 1300 further includes control module 1308, which is used as a flight control system for the satellite. In particular, control module 1308, which may operate using distinct processing circuitry on satellite computing system 1300, may be responsible for power management, logistics, and flight control of the satellite. In some examples, control module 1308 may receive requests from nodes 1310 and operating system 1308 to provide data to the applications on nodes 1310. If a request can be accommodated, without compromising the flight of the satellite, control module 1308 may provide the requested data to operating system module 1309 or the corresponding node. In contrast, if it is determined that the information cannot be provided or a flight operation cannot be accommodated, then control module 1308 may fail to provide the data or the flight operation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the disclosure. Those skilled in the art will also appreciate that the features described above can be combined in various ways to form multiple implementations. As a result, the invention is not limited to the specific implementations described above, but only by the claims and their equivalents.

What is claimed is:

1. A satellite system, comprising:
   satellite devices in low-earth orbit (LEO) configured to establish a pseudo-geosynchronous communication window corresponding to a ground communication system by at least transferring traffic routing instructions from outgoing satellite devices leaving the pseudo-geosynchronous communication window for receipt by target satellite devices entering the pseudo-geosynchronous communication window, wherein the traffic routing instructions indicate at least a portion of communication traffic among the satellite system for routing to the ground communication system; and
   during passage within the pseudo-geosynchronous communication window, the target satellite devices each configured to route at least the portion of communications received in the target satellite devices in accordance with the traffic routing instructions, wherein the satellite devices route at least the portion of communications for delivery to the target satellite devices through zero or more intermediate ones of the satellite devices.

2. The satellite system of claim 1, comprising:
   responsive to detecting exit from the pseudo-geosynchronous communication window, the outgoing satellite devices each configured to determine at least a portion of the traffic routing instructions, and deliver at least the portion of the traffic routing instructions to associated target satellite devices.

3. The satellite system of claim 1, comprising:
responsive to detecting entry into the pseudo-geosynchronous communication window, the target satellite devices each configured to request at least a portion of the traffic routing instructions from associated outgoing satellite devices.

4. The satellite system of claim 1, comprising:
the satellite devices configured to determine entry into or exit from the pseudo-geosynchronous communication window based at least on determining overhead proximity to the ground communication system as defined by geographic coordinates.

5. The satellite system of claim 1, comprising:
the satellite devices configured to determine entry into or exit from the pseudo-geosynchronous communication window based at least on line-of-sight established with the ground communication system.

6. The satellite system of claim 1, comprising:
the satellite devices configured to determine entry into or exit from the pseudo-geosynchronous communication window based at least on signal strength of the ground communication system.

7. The satellite system of claim 1, wherein a subset of the satellite devices orbit in a higher orbital distance from others of the satellite devices that pass through the pseudo-geosynchronous communication window, and comprising:
the subset of the satellite devices configured to route associated communications for delivery to the ground communication system via the others of the satellite devices that pass through the pseudo-geosynchronous communication window.

8. The satellite system of claim 1, wherein the traffic routing instructions indicate to route at least a portion of satellite-to-ground communications received in the target satellite devices for delivery through the ground communication system; and
wherein the traffic routing instructions further indicate to route ground-to-satellite communications received from the ground communication system in the target satellite devices to one or more of the satellite devices.

9. A method of operating a satellite system, comprising:
establishing a pseudo-geosynchronous communication window among satellite devices in low-earth orbit (LEO) with relation to a ground communication system by at least transferring traffic routing instructions from outgoing satellite devices leaving the pseudo-geosynchronous communication window for receipt by target satellite devices entering the pseudo-geosynchronous communication window, wherein the traffic routing instructions indicate at least a portion of communication traffic among the satellite system for routing to the ground communication system; and
during passage within the pseudo-geosynchronous communication window, routing at least the portion of communications received in the target satellite devices in accordance with the traffic routing instructions, wherein the satellite devices route at least the portion of communications for delivery to the target satellite devices through zero or more intermediate ones of the satellite devices.

10. The method of claim 9, further comprising:
in the outgoing satellite devices, responsive to detecting exit from the pseudo-geosynchronous communication window, determining at least a portion of the traffic routing instructions, and delivering at least the portion of the traffic routing instructions to associated target satellite devices.

11. The method of claim 9, further comprising:
in the target satellite devices, responsive to detecting entry into the pseudo-geosynchronous communication window, requesting at least a portion of the traffic routing instructions from associated outgoing satellite devices.

12. The method of claim 9, further comprising:
in the satellite devices, determining entry into or exit from the pseudo-geosynchronous communication window based at least on overhead proximity to the ground communication system as defined by geographic coordinates.

13. The method of claim 9, further comprising:
in the satellite devices, determining entry into or exit from the pseudo-geosynchronous communication window based at least on line-of-sight established with the ground communication system.

14. The method of claim 9, further comprising:
in the satellite devices, determining entry into or exit from the pseudo-geosynchronous communication window based at least on signal strength of the ground communication system.

15. The method of claim 9, wherein a subset of the satellite devices orbit in a higher orbital distance from others of the satellite devices that pass through the pseudo-geosynchronous communication window, and further comprising:
in the subset of the satellite devices, routing associated communications for delivery to the ground communication system via the others of the satellite devices that pass through the pseudo-geosynchronous window.

16. The method of claim 9, wherein the traffic routing instructions indicate to route at least a portion of satellite-to-ground communications received in the target satellite devices through the ground communication system; and
wherein the traffic routing instructions further indicate to route ground-to-satellite communications received in the target satellite devices from the ground communication system to one or more of the satellite devices.

17. A satellite device, comprising:
a control system configured to detect overhead proximity to a ground communication system and establish a pseudo-geosynchronous communication window corresponding to the overhead proximity to the ground communication system while the satellite device orbits in a low-earth orbit;
a processing system configured to execute communication routing tasks with regard to the ground communication system in accordance with traffic routing instructions received from a further satellite device exiting the pseudo-geosynchronous communication window, wherein the traffic routing instructions indicate at least a portion of communication traffic received in the satellite device for routing to the ground communication system, and wherein one or more satellite devices route at least the portion of communications for delivery to the satellite device through zero or more intermediate satellite devices; and
responsive to the control system detecting exit from the pseudo-geosynchronous communication window, a communication system configured to transfer information comprising further traffic routing instructions for delivery to at least another satellite device for use in execution of further communication routing tasks by the other satellite device during passage through the pseudo-geosynchronous communication window.

18. The satellite device of claim 17, comprising:

the control system configured to determine entry into or exit from the pseudo-geosynchronous communication window based at least on detected signal strength of the ground communication system;

during the orbital passage within the pseudo-geosynchronous communication window, the processing system further configured to direct the communication system to route at least the portion of communications traffic received from one or more satellite devices in accordance with corresponding traffic routing instructions to deliver at least the portion of the communications traffic to the ground communication system; and during the orbital passage within the pseudo-geosynchronous communication window, the processing system further configured to direct the communication system to route at least a portion of further communications traffic received by the satellite device from the ground communication system in accordance with the corresponding traffic routing instructions to deliver at least the portion of the further communications traffic to the one or more satellite devices.

19. A satellite system, comprising:

satellite devices in low-earth orbit (LEO) configured to establish a pseudo-geosynchronous communication configuration corresponding to a ground communication system by at least transferring traffic routing instructions from outgoing satellite devices leaving the pseudo-geosynchronous window for receipt by target satellite devices entering the pseudo-geosynchronous window, wherein the traffic routing instructions at least indicate traffic of the satellite system to route to the ground communication system;

during passage within the pseudo-geosynchronous window, the target satellite devices each configured to route at least a portion of communications received in the target satellite devices from the satellite devices for delivery to the ground communication system in accordance with the traffic routing instructions; and a subset of the satellite devices configured to route associated communications for delivery to the ground communication system via the target satellite devices, wherein the subset of the satellite devices orbit in a higher orbital distance than the target satellite devices.

20. A method of operating a satellite system, comprising:

establishing a pseudo-geosynchronous communication window among satellite devices in low-earth orbit (LEO) with relation to a ground communication system by at least transferring traffic routing instructions from outgoing satellite devices leaving the pseudo-geosynchronous communication window for receipt by target satellite devices entering the pseudo-geosynchronous communication window, wherein the traffic routing instructions indicate at least a portion of communication traffic among the satellite system for routing to the ground communication system;

during passage within the pseudo-geosynchronous communication window, routing at least the portion of communications received in the target satellite devices in accordance with the traffic routing instructions; and in a subset of the satellite devices, routing associated communications for delivery to the ground communication system via the target satellite devices, wherein the subset of the satellite devices orbit in a higher orbital distance than the target satellite devices.

* * * * *